US006732012B2

(12) United States Patent
Hendrickson et al.

(10) Patent No.: US 6,732,012 B2
(45) Date of Patent: May 4, 2004

(54) FLATS BUNDLE COLLATOR

(75) Inventors: David Brian Hendrickson, Columbia, MD (US); Daryl Mileaf, Hanover, MD (US); William P. McConnell, Woodstock, MD (US); David Jerome Tilles, Woodstock, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 211 days.

(21) Appl. No.: 10/079,509

(22) Filed: Feb. 22, 2002

(65) Prior Publication Data

US 2002/0074268 A1 Jun. 20, 2002

Related U.S. Application Data

(62) Division of application No. 09/801,647, filed on Mar. 9, 2001, now Pat. No. 6,443,311, which is a continuation of application No. 09/310,221, filed on May 12, 1999, now Pat. No. 6,241,099.

(51) Int. Cl.[7] .................................................. G06F 7/00

(52) U.S. Cl. ....................... 700/224; 700/223; 700/220; 700/219; 209/542

(58) Field of Search ................................ 700/213, 219, 700/220, 221, 223, 224; 209/539, 540, 541, 542, 545, 584, 900, 914, 918, 919; 271/3.01, 3.14

(56) References Cited

U.S. PATENT DOCUMENTS

| | | | | |
|---|---|---|---|---|
| 4,503,977 A | | 3/1985 | Kohno et al. | |
| 4,627,540 A | * | 12/1986 | Takeda | 209/555 |
| 5,042,667 A | * | 8/1991 | Keough | 209/3.1 |
| 5,119,954 A | | 6/1992 | Svyatsky et al. | |
| 5,901,855 A | * | 5/1999 | Uno et al. | 209/584 |
| 5,924,576 A | * | 7/1999 | Steenge | 209/584 |
| 6,241,099 B1 | | 6/2001 | Hendrickson et al. | |
| 6,443,311 B2 | * | 9/2002 | Hendrickson et al. | 209/542 |
| 6,598,748 B2 | * | 7/2003 | Mileaf et al. | 209/542 |
| 6,601,847 B2 | * | 8/2003 | Hendrickson et al. | 271/302 |

FOREIGN PATENT DOCUMENTS

| | | |
|---|---|---|
| JP | 420067 7 | 7/1992 |
| SU | 162379 8 | 1/1991 |

* cited by examiner

*Primary Examiner*—Khoi H. Tran
(74) *Attorney, Agent, or Firm*—Birch, Stewart, Kolasch & Birch, LLP

(57) ABSTRACT

A method and an apparatus for collating a plurality of groups of mail items, such as flats mail, each group being pre-sequenced according to prioritized delivery addresses, into a final sequenced set of the mail items from the groups, utilizing the prioritized delivery addresses. Each bundle of mail items is formed into a single input stream of the individual mail items. The mail items are transported along a conveyor system from the input stream to a staging station. The mail items are sorted at the staging station into a plurality of subsets of mail items re-sequenced as an intermediate step to achieving the final sequenced sets. The mail items are then collated and merged into a single output stream from the respective subsets of mail items in the final sequenced set. Portions of the output stream from the staging station are collected in batches which maintain the sequence consistent with the prioritized delivery order sequence of the mail for a given carrier route.

14 Claims, 21 Drawing Sheets

| COLLATION RULES | NEXT SEQ | CUR TIME | CALCULATION | FEED TIME |
|---|---|---|---|---|
| TEST THE NEXT SEQUENCE NUMBER AS FOLLOWS: | 1 | 0 | 0 | 0 |
| • IF NEXT SEQ IS IN SAME TOWER, THEN FEED TIME IS CURRENT TIME+1 | 2 | 0 | 0-(1-1) | 0 |
| | 3 | 0 | 0+(2+1) | 3 |
| • IF NEXT SEQ IS UPSTREAM, THEN FEED TIME IS CURRENT TIME-(DIFFERENCE IN BUFFERS-1) | 4 | 3 | 3+1 | 4 |
| | 5 | 4 | 4-(2-1) | 3 |
| • IF NEXT SEQ IS DOWNSTREAM, THEN FEED TIME IS CURRENT TIME+(DIFFERENCE IN BUFFERS+1) | 6 | 3 | 3+1 | 4 |
| | 7 | 4 | 4+(1+1) | 6 |
| SETUP FOR 'NEXT' NEXT SEQUENCE NUMBER | 8 | 6 | 6+(1+1) | 8 |
| THEN SET, CURRENT TIME=PREVIOUS FEED TIME | 9 | 8 | 8+1 | 9 |

*FIG. 18A*

| FEED TIME | FEED SEQ |
|---|---|
| 0 | 1,2 |
| 1 | NONE |
| 2 | NONE |
| 3 | 3,5 |
| 4 | 4,6 |
| 5 | NONE |
| 8 | 8 |
| 9 | 9 |
| 10 | NONE |

*FIG. 18B*

| | |
|---|---|
| MAXIMUM LENGTH | 80 |
| MINIMUM GAP | 25 |
| ADVANCE/RETARD | 5 |

CONVEYOR POSITIONS

| SENSOR | POSITION |
|---|---|
| FEED | 0 |
| BCR | 400 |
| END1 | 650 |
| 1 | 800 |
| 2 | 900 |
| 3 | 1000 |
| 4 | 1100 |
| 5 | 1200 |
| 6 | 1300 |
| 7 | 1400 |
| 8 | 1500 |
| 9 | 1600 |
| 10 | 1700 |
| END2 | 2100 |

SYSTEM CONSTANTS

FIG.21

CONVEYOR MAIL PIECE TRACKING LIST

| PIECE SEQ | POSITION | GAP | LENGTH | NEXT SENSOR | TOWER |
|---|---|---|---|---|---|
| 1 | 1470 | 130 | 40 | 10 | 10 |
| 2 | 1216 | 40 | 65 | 9 | 10 |
| 3 | 1105 | 250 | 52 | 6 | 10 |
| 4 | 870 | 62 | 73 | 5 | 10 |
| 5 | 750 | # | 63 | 1 | 9 |
| # | # | # | # | # | # |
| N | 300 | 0 | 37 | END1 | 0 |

FEEDER OUTPUT TRACKING

| SENSOR | POSITION | GAP | LENGTH | NEXT SENSOR | TOWER |
|---|---|---|---|---|---|
| FEED | # | # | # | BCR | 0 |

REAL-TIME VARIABLES

FIG.22

FLATS BUNDLE COLLATOR

This application is a divisional of Ser. No. 09/801,647 filed Mar. 9, 2001 now U.S. Pat. No. 6,443,311 which is a continuation of Ser. No. 09/310,221 filed May 12, 1999 now U.S. Pat. No. 6,241,099.

BACKGROUND OF THE INVENTION

The present invention relates to a method and system for collating a plurality of groups of mail items, each group being pre-sequenced according to prioritized delivery addresses, into a final sequenced set of the mail items from the groups, utilizing the prioritized delivery addresses. More specifically, the present invention relates to a process and system that merges several sequenced bundles of flats mail into one sequenced set of mail for delivery by a mail carrier according to a prioritized delivery address sequence, commonly known as a delivery order sequence (DOS) or walk sequence (WS).

Flats mail, routinely delivered by mail carriers, includes magazines, newspapers, padded envelopes, single sheet fliers, compact disks in boxes, poly-wrapped items, and miscellaneous other types of mail items. These flats range in size from 4" to 15.75" in length; 4" to 12" in width; 0.007" to 1.25" in thickness; and 1/100 lb. to 6 lb. in weight. Delivery of these flats in delivery order sequence, or walk sequence, requires special sorting in a post office facility such as a delivery unit (DU). In general, DU operations are consistent from one office to another within the U.S. postal system. However, different route types (rural, city, park and loop) may process flats in slightly different manners within the same facility. The flats to be processed arrive from a variety of sources in a number of different ways. Mailers may drop ship saturation mailings (mass mailings) two to seven days prior to the delivery per an agreement with the local Postmaster. Other mailings can arrive on pallets (periodicals, national advertisements or catalogs) after passing through the postal network of facilities as cross-dock material. Other material may be broken down from pallets at an upstream facility if a pallet was shipped as three-digit material. Other flats may have been processed on flats sorting equipment known in the art, and are then processed according to carrier route. Still more material can pass through bulk mail centers as bundles before arriving at the delivery unit (DU).

Currently, with the exception of saturation (mass) mailings, the majority of this material is not in carrier walk sequence (WS) or delivery order sequence (DOS). Bundles may be in enhanced carrier line-of-travel (ECLOT) or in carrier route, but not walk sequence. Less than 1% of the mailings in the field have an eleven digit (ZIP+4+2) delivery point barcode representative of the delivery point sequence (DPS). Many saturation mailings have no barcode at all and are addressed to "Postal Customer" with no address. Other mailings have 5 or 9 digit ZIP codes and "marriage" mailings consisting of two materials; an address card or leaflet, and a second mailing with no address label intended to be left at the same address as the card. However, in order to provide for flats bundle collating in an automated fashion, it is possible to provide all of the flats mail with eleven digit coding inclusive of delivery point sequence information.

In current operations, the source and configuration of the flats being processed has little or no impact on how they are processed in the DU in preparation for delivery. In general, the following preparation of flats for delivery occurs (there are other activities such as held mail or registered mail that are performed that are not noted here to simplify the explanation):

1. In preparation for casing operations, mail personnel sort through flats, bundles and mailings from all sources and separate them by carrier early in the morning (beginning around 4:00 AM). This is done in staging areas using tubs, hampers or large cases.
2. Flats are delivered to the carrier casing area and set in a staging area.
3. Carriers case the flats, along with other mail types (this activity is performed in the morning usually from 6:00 AM or 7:00 AM to sometime between 9:00 AM and 11:00 AM, depending on route size and the amount of mail). The current postal standard for casing unsequenced flats is 8 per minute. On some routes or in some DU's, carriers do not case saturation mailings and treat them as an additional bundle during delivery. Other carriers may split saturation mailings and deliver portions of them on consecutive days to load level the amount of mail to be delivered.
4. Cased mail is removed and placed in trays to be delivered.
5. The carrier leaves the facility and delivers the mail.
6. In some DU's, carriers case mail upon return to the facility in the afternoon in preparation for the next day.

For some portion of the morning, activities 1 and 2 above, can overlap with the casing operation and may extend until after the carrier has left the facility leaving mail to be cased either later that day or the next morning. All cased mail is removed in carrier walk sequence, and carriers carefully case flats so that all address labels are on the same edge of the mail (even if this means that the label is upside down relative to other addresses in the bundle) to ensure easy reading while doing deliveries. Depending on the route type and/or the carrier's preference, marriage mailings may case either the address card or both the address card and the mailing cased (some prefer to case only the card and pull the mailing at each house that has a card in the delivery).

These activities can take up to 50% of a carrier's in-office time, and therefore, limit the amount of deliveries can perform in the remainder of the day. This is one of the limiting factors in the number of stops that a carrier route can contain (obviously the amount of mail, the distance between the stops, the demographics of the route area, and other factors are involved as well). It stands to reason, that by making the in-office activities more efficient, i.e. providing delivery point sequence (DPS) flats, then carriers can be expected to spend less time in the facility and more time on the route. This added time can allow for additional stops on routes and the possible consolidation of some routes into others. This scenario is analogous to the introduction of DPS letter mail through the use of automation to a great degree. However, the types of mail (flats) and the different ways that the mail arrives at a facility does make the task of creating a single bundle of DPS flats a challenging proposition. The automation of sorting and collating of flats by their physical nature is a very difficult task due to the large variation in sizes and types of the flats material.

SUMMARY OF THE INVENTION

Accordingly, it is a primary object of the present invention to develop a system and process for collating flats mail using a small, flexible, inexpensive machine that is easy to operate, reliable, and requires easy and infrequent maintenance.

It is the further object of the present invention to develop a process and system which utilizes standard sort schemes for carrier walk sequences utilized for sorting conventional mail other than flats.

It is another object of the present invention to provide an apparatus for sorting flats having a small footprint in order to take up a minimum amount of space in the sorting facility.

It is yet another object of the present invention to provide an apparatus for sorting flats, which is modular in construction for flexible sizing through the use of additional modular components, including staging towers.

It is still another object of the present invention to provide an apparatus for sorting flats wherein only a single operator is required.

It is another object of the present invention to provide an apparatus for sorting flats having low maintenance and operating costs.

The objects of the present invention are fulfilled by providing a method and apparatus for collating a plurality of groups of mail items, such as flats, each group being pre-sequenced according to prioritized delivery addresses (delivery order sequence DOS), into a final sequenced set of the mail items from the groups, utilizing the prioritized delivery addresses (DOS), comprising the steps of:

- separating each bundle of mail seriatim into a single input stream of the individual mail items;
- transporting the mail items from the input stream to a staging station;
- sorting the mail items at the staging station into a plurality of subsets of mail items re-sequenced as an intermediate step to achieving said final sequence sets;
- merging the mail items into a single output stream from the respective subsets of mail items in said final sequenced set; and
- collecting portions of the output stream of the mail items consistent with the sequence of the final sequenced set to form batches of mail for orderly delivery to the prioritized delivery addresses (DOS) according to delivery criteria reflected in said final sequenced set.

In a preferred embodiment, the staging station includes a plurality of juxtaposed vertical stacks in staging towers, each stack including a plurality of vertically stacked and spaced shelves for supporting the flats mail thereon. The flats are stored in the stacks of the respective staging towers in a last-in-first-out sequence (LIFO).

Each flat has a machine-readable number thereon representative of the delivery order sequence (DOS) with lower numbers representing higher delivery priorities. A reader is provided for generating control signals for routing the flats to predetermined ones of the vertical stacks or towers at the staging station, the flats in each stack being positioned in ascending order number from the bottom to the top of the stack.

The unloading of each stack to form the output stream of mail items in the final sequenced set is fed out in reverse order, mainly from the lower numbers at the bottom of the respective stacks to the higher numbers in the stacks, until all items are merged into the final output stream.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 17, 18A, 18B and 19A to 19L are diagrammatic illustrations of the flow of the pre-sequenced bundles of flats through the flats bundle collator system of the present invention;

FIGS. 20 through 23 are illustrative of flats position and jam detection control parameters of the flats bundle collator system of the present invention.

DETAILED DESCRIPTION OF PREFERRED EMBODIMENTS

Figure 1:
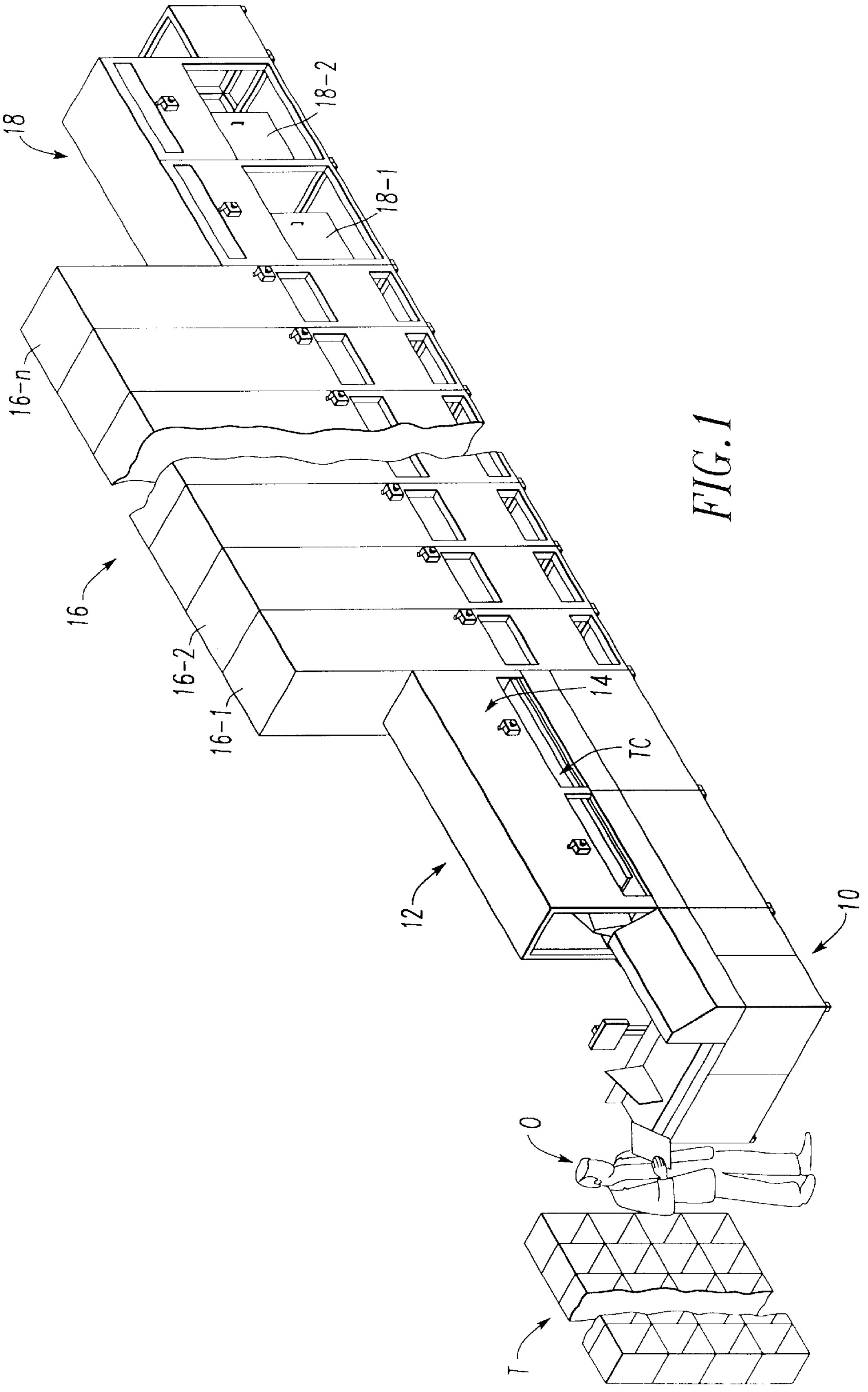
FIG. 1 is a perspective view of a modular flats bundle collator (FBC) system according to the preferred embodiment of the present invention.

Referring now to the drawing figures, FIG. 1 depicts the overall flats bundle collator system of the present invention.

The system includes the following components: a feeder assembly 10; a combined orienter/reader assembly including a transport conveyor TC, a flats orienter module 12, a barcode reader module 14; a staging tower assembly 16 including multiple staging towers 16-1, . . . , 16-*n*; and a containerizer module 18 including two containerizer assemblies 18-1 and 18-2. Bundles of mail in the United States Postal System mail tubs T are loaded onto the feeder assembly 10 by an operator O. The mail is first oriented to have the mailing label up by the orienter module 12. The address is then read by the barcode reader module 14. All of the mailings F, except for the last, are staged in the staging tower assembly 16. Mail is removed from the multiple staging towers as the last mailing is fed from the feeder 10 in such a way as to make the mail stream in a desired final sequence. The mail is conveyed out of the staging tower assembly 16 to the containerizer module 18, where it is stacked in selected ones of United States Postal Service (USPS) tubs, not shown. Multiple pre-sequenced mailings can be fed into the machine. Each mailing can consist of several bundles of mail, each bundle containing several pieces. Each mailing is in delivery point sequence (DPS) or walk sequence (WS).

The operator O places all but the last mailing in the feeder 10 with the lower number stop in the first position. The feeder 10 then removes one piece of flats mail F at a time from the stack and injects it into the flats orienter module 12. The feeder 10 will feed all of the mail in this manner until it reaches the last mailing. The last mailing is loaded with the lowest number stop in the last position.

If there is not a saturation mailing (a mass mailing) to be included in the sorting process, the operator notifies the system that loading is complete by pressing a button on the system control panel to be described hereinafter. However, if there is a saturation mailing, the operator notifies the system and begins loading the saturation mailing into the feeder 10. The system compares the contents of the staging tower assembly 16 to the carrier's walk sequence and calculates the output sequence to collate the system contents into the sequence. If there is not a saturation mailing, the system calculates the output sequence directly from the tower contents. If a saturation mailing is included, the system calculates the output sequence from the towers 16-1, . . . , 16-*n* and includes the feeder 10 saturation output in the collation calculation.

The tower assembly 16 outputs the flats F, and the feeder 10 inputs saturation flats if they are present, such that they are transported into the mail tubs in the containerizer module 18. The operator O then removes the tubs and prepares to input the next carrier route bundles into the system. A more complete description of operation follows in the description of FIG. 15.

The flats bundle collator according to the preferred embodiment of the subject invention occupies about 75 square feet of floor space with a ten tower configuration. The system weighs about 8000 pounds, and exerts floor loading not to exceed 42 psi. The collator requires 3-phase electric power for operation.

The feeder module 10, for use with the system of the present invention, is a commercially available component manufactured by Alcatel, known in the industry as the "Alcatel TOP Feeder". This feeder is highly reliable and easy to maintain. The feeder has a throughput of 3 flats per second; a jam rate of 1/2500 flats; a jam recovery in 5 seconds; accepts all USPS flats mail sizes; feeds on demand with a 20 ms response time; and is well accepted in the user community.

As noted above, the flats orienter module 12 receives the output of the feeder module 10. Its operation is illustrated in FIGS. 2A and 2B.

Figure 2A:
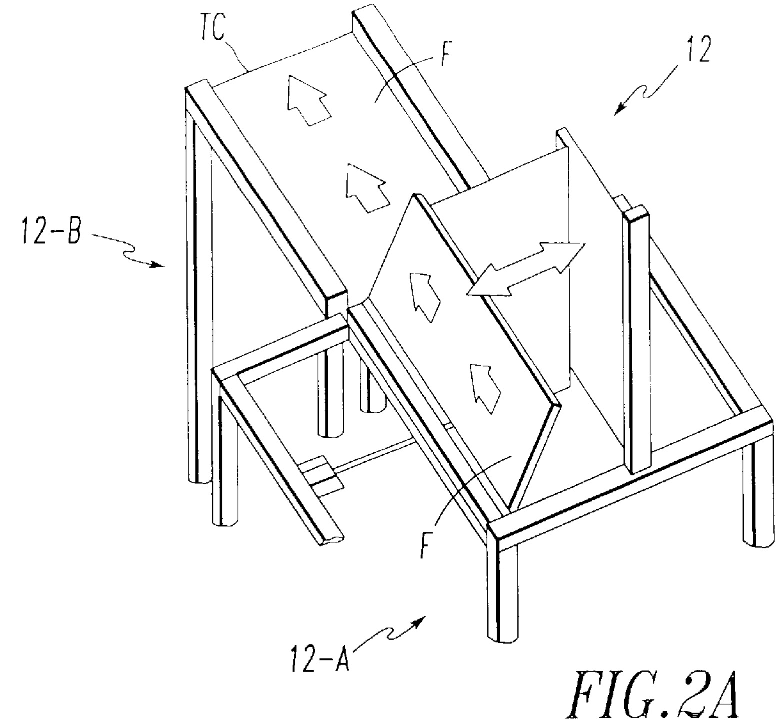
FIGS. 2A and 2B are perspective views illustrative of the flats diverter module of the system of FIG. 1.
Figure 2B:
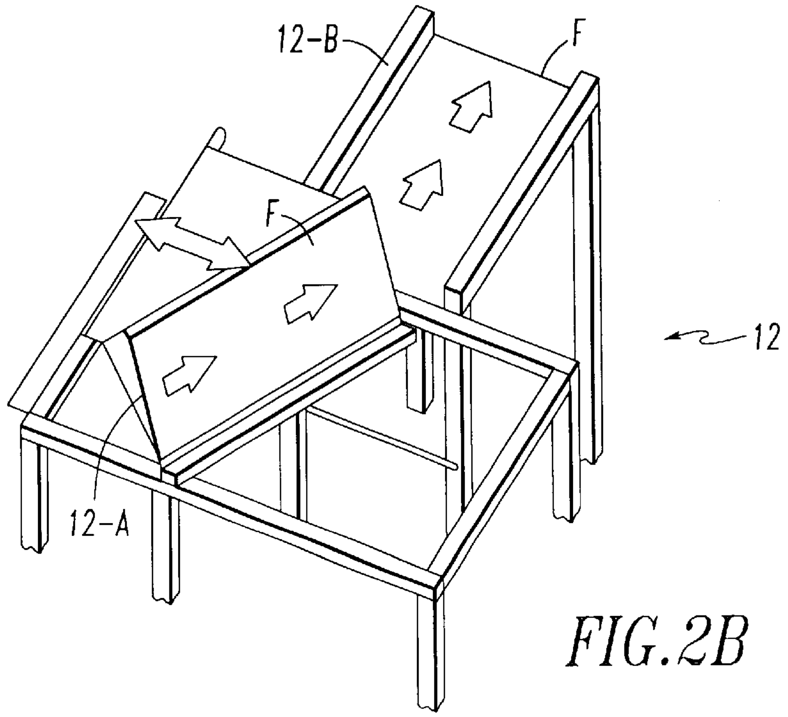

Referring now to FIGS. 2A and 2B, as flats F exit the feeder module 10, the orienter module 12 places them label up on the transport conveyor TC using one of two tiltable conveyor sections 12A and 12-B. Flats F to be staged are processed on one path as illustrated in FIG. 2A and saturation mailings are processed on the other path illustrated in FIG. 2B. The flats orienter module 12 indexes conveyor section 12A via a traversing carriage which moves in the direction of the double arrow in FIGS. 2A and 2B to move the section 12A between the respective left-hand and right-hand positions illustrated in these figures. The carriage remains in a "home" position for all mail to be staged in the towers, as illustrated in FIG. 2A and indexes to the position shown in 2B only if the operator notifies the system that a saturation mailing is about to be fed. Where ten towers comprise the towers 16-1, . . . , 16-*n*, saturation mailings (mass mailings) must be fed in reverse order relative to mailings staged in the towers. Mail F enters the towers from the first stop to last, and because the towers are Last In First Out (LIFO), the mail F leaves the towers, last stop to first, during the collation process. To process saturation mailings directly from the feeder 10 the saturation mailing must be fed last stop to first. This is accomplished by placing the bundles into the feeder 10 facing the opposite direction of the staged mail. The orienter module 12 then reorients the flats for reading by the reader 14 as they exit the feeder 10. That is, all of the mail flats F but the last mailing leave the feeder 10 with the bound side of the flat (assuming there is a bound side) and the address label facing right. The orienter 12 tips the mail over to the left, so that mail leaves the orienter with the bound side to the right and the label side up. The mail in the last mailing leaves the feeder with the bound edge down, and the label facing the left side. The orienter 12 tips this mail over to the right, so that the mail leaves the orienter with the bound side to the left and the label facing up. The mail leaves the flat orienter section 12 and then enters the barcode reader module section 14. The barcode reader module 14 is typically a reader, such as the AccuSort Model No. AV1200. This type of barcode reader is a high quality off-the-shelf reader, which has proven to be very reliable in service to the USPS. In this reader section, a barcode including the destination point sequence (DPS), carrier walk sequence printed on the flats F is read by the reader 14 and the address is sent to the main computer controller to be subsequently described. The location that is assigned to the flat will be used later to determine the output order of the flats F with the lowest number on the top of the output stack. The flats mail then leaves the barcode reader section 14 and enters the staging tower assembly 16. Each piece of mail F is inducted into the staging tower 16 that has the closest, lower number flat. If there is no tower that fits this requirement, the flat is inducted into the first empty tower. When all but the last mailing has been staged in one or more towers of the tower assembly 16, the last mailing is loaded in the feeder 10 as described hereinbefore. The mail F is processed normally until it reaches the staging tower assembly 16. When the first piece of mail arrives at the staging towers 16-1, . . . , 16-*n*, a collation algorithm stored in the control system operates the unloading of the staging towers to form the final mail stream.

The mail is fed from the barcode reader module 14 and/or the staging tower assembly 16 to achieve a final sequenced set of flats with the highest number stop first. The mail is sequenced, and the mail uniformly spaced. When the mail leaves the staging tower assembly 16, it is fed into the containerizer assemblies 18-1 and 18-2 of containerizer module 18. The containerizers 18-1 and 18-2 stack mail in the sequence in which it was received, and maintains that sequence. Two containerizers 18-1 and 18-2 are preferably utilized so that when the operator is emptying one, the machine can continue to fill the other.

Figure 2C:
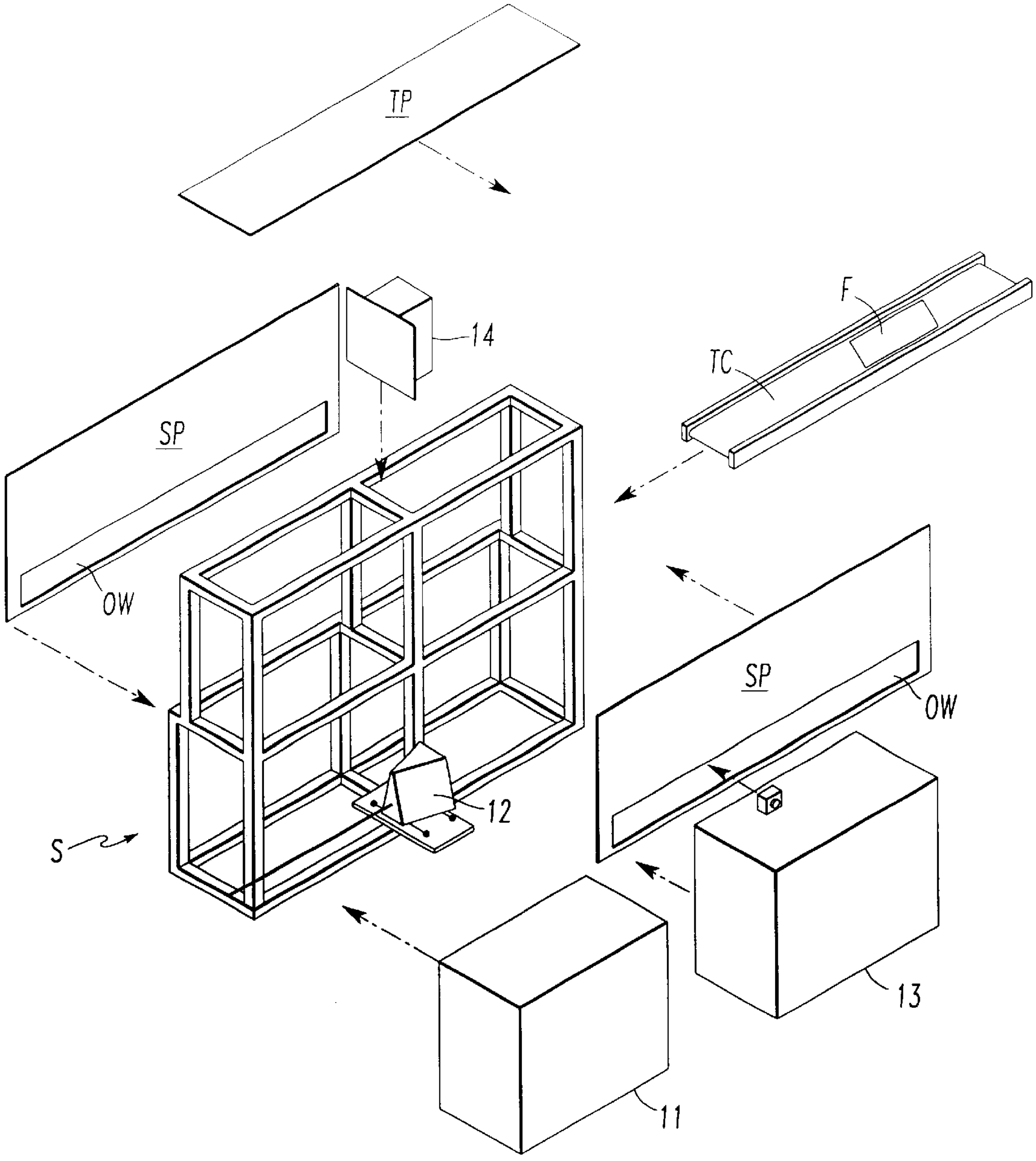
FIG. 2C is an exploded view of the embodiment of a combined orienter and reader module for use in the system of FIG. 1.
Figure 2D:
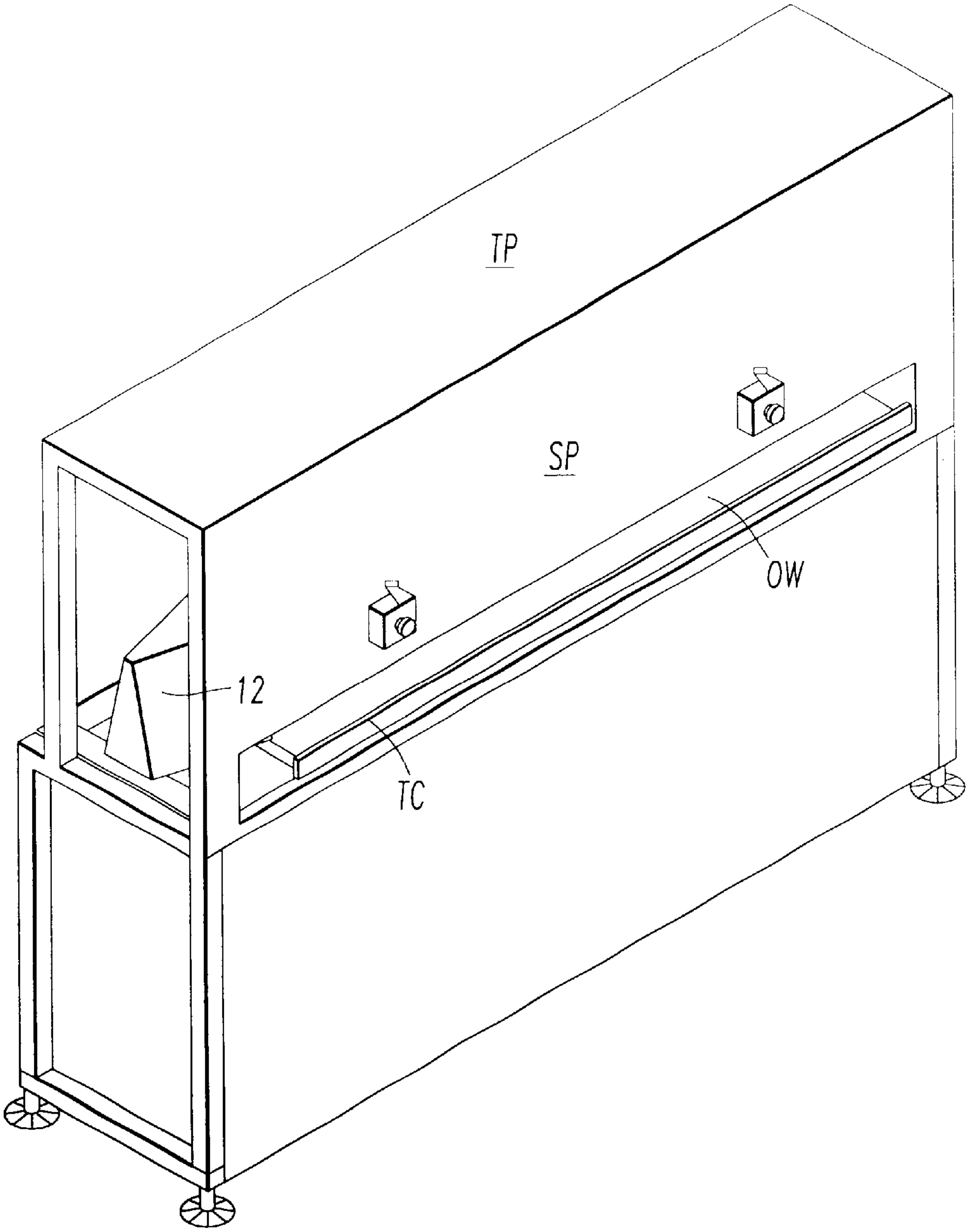
FIG. 2D is a perspective view of the orienter/reader module of FIG. 2 depicting the module assembled.

Referring now to FIGS. 2C and 2D, the flats items are fed between the feeder 10 and the staging tower assembly 16 through the orienter module 12 and the reader module 14 via the transport conveyor TC. The details of the combined orienter/reader assembly is illustrated in the exploded view of FIG. 2C. The assembly includes an open frame structure F having four juxtaposed sections for receiving the orienter/diverter module 12, the barcode reader module 14, a power distribution module 11 and system input/output electronics assembly 13. These components are enclosed within a top panel TP and two side panels SP in the upper two sections of the frame structure. Side panels SP also include one or more observation windows OW therein so that the flats items can be observed as they pass through the modules 12 and 14 from the feeder 10 to the staging tower assembly 16. Observation windows, not shown, can also be provided in the sections of the staging towers 16-1, . . . , 16-*n*.

FIG. 2D depicts the orienter/reader modules 12 and 14 in an assembled condition. It can be seen that the path of flats items fed from feeder 10 to the staging tower assembly 16 via the orienter/reader modules 12 and 14 passes the items along a horizontal path via the conveyor TC at the output side of the module into the staging tower assembly 16.

Any number of staging towers 16-1, . . . , 16-*n* may be utilized and any number of containerizers 18-1, . . . , 18-*n* without departing from the spirit and scope of the present invention. In fact, an advantage of the system of the present invention is its modularity, which facilitates the addition or deletion of staging towers and containerizers as needed to satisfy the footprint requirement of the space in which it is to be utilized.

Figure 3:
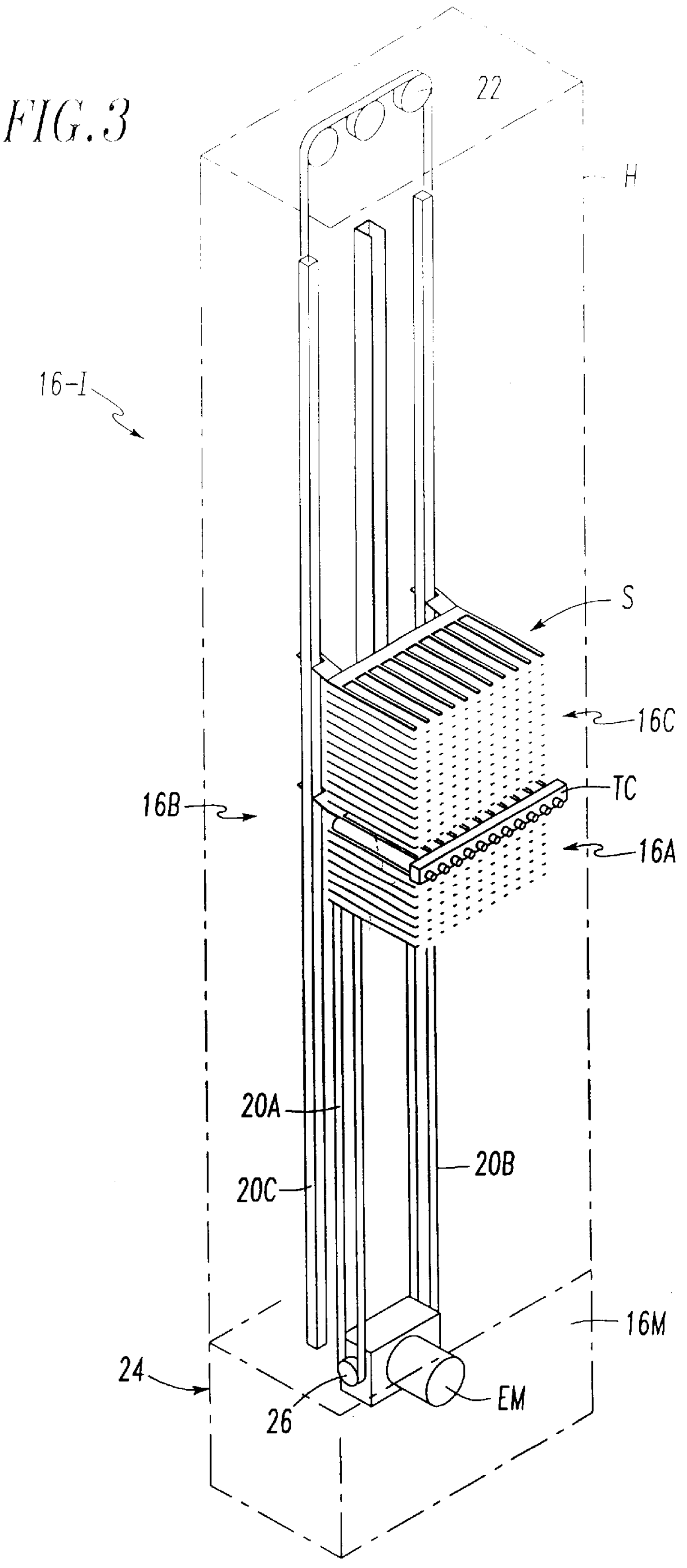
FIG. 3 is a perspective view of one of the staging tower modules of FIG. 1 illustrating details of the elevator mechanism thereof.

Details of one of the staging towers 16-1 is shown in FIG. 3. Staging tower 16-1 includes a section of a roller conveyor TC, a shelving assembly S, a shelf drive system including a motor EM, a chain and sprocket drive assembly 24, and drive shafts 26 coupled to the elevator mechanism, timing belts 20A, 20B, 20C. Each tower also includes a housing H formed from the frame and body panels.

The conveyor drive systems are designed to be "daisy chained" together allowing the system to function with a single drive motor and providing easy expansion by simply adding more towers 16-*m* to the drive line through the use of universal joint couplings. The shelf drive system including motor EM, chain and sprockets assembly 24, and drive shafts 26 is located in a bottom section 16M of the tower for easy access. Each tower has an access door, not shown, that fully exposes the interior of the tower when open to provide easy access by an operator.

Figure 4:
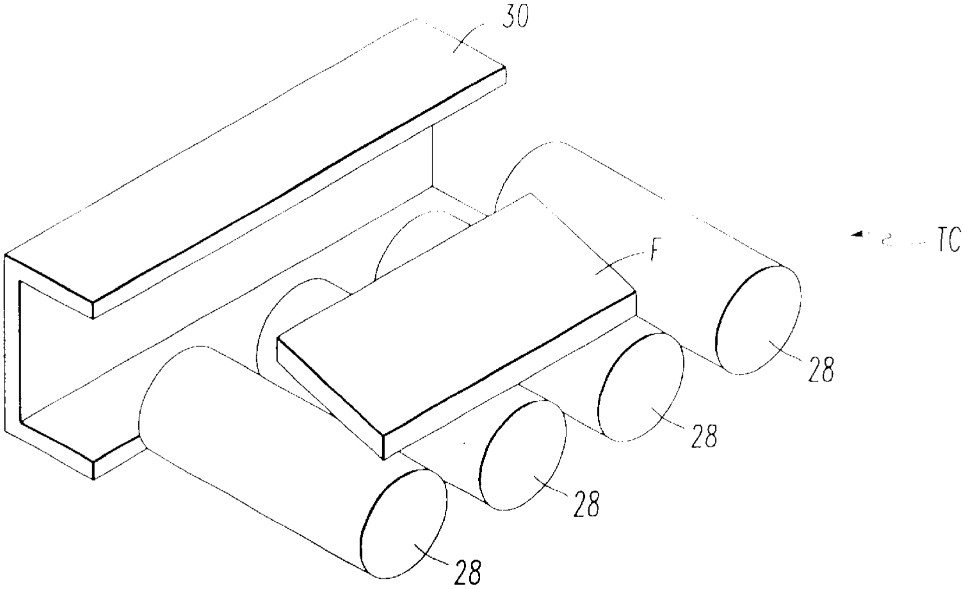
FIG. 4 is a perspective view of a portion of the transport conveyor of the flats bundle collator system illustrating how the flats are edge-justified as they traverse the surface of the conveyor within the staging towers.
Figure 5:
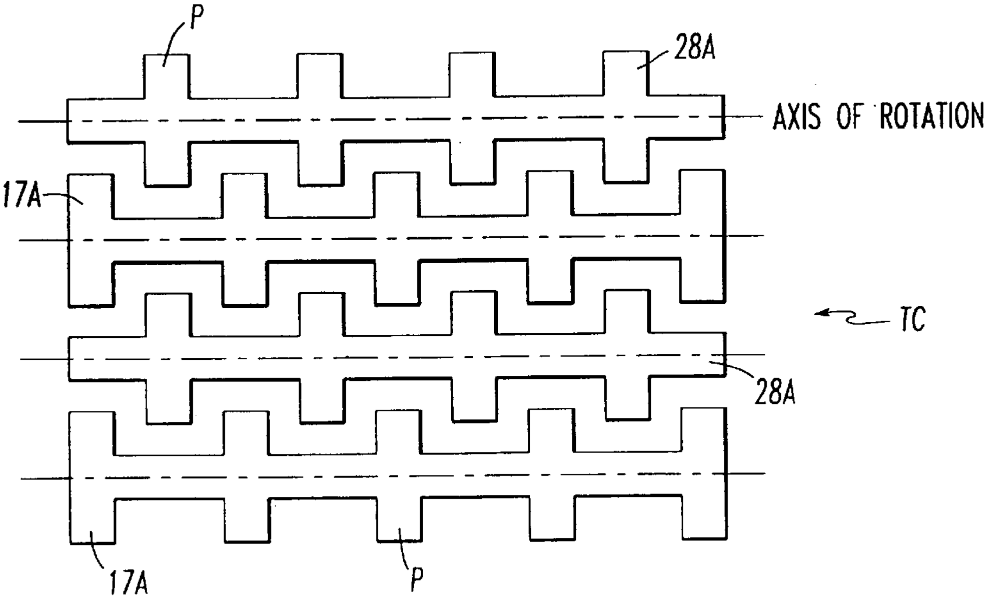
FIG. 5 is an alternative embodiment of conveyor roller structures of a transport conveyor suitable for use in the system of the present invention.
Figure 6:
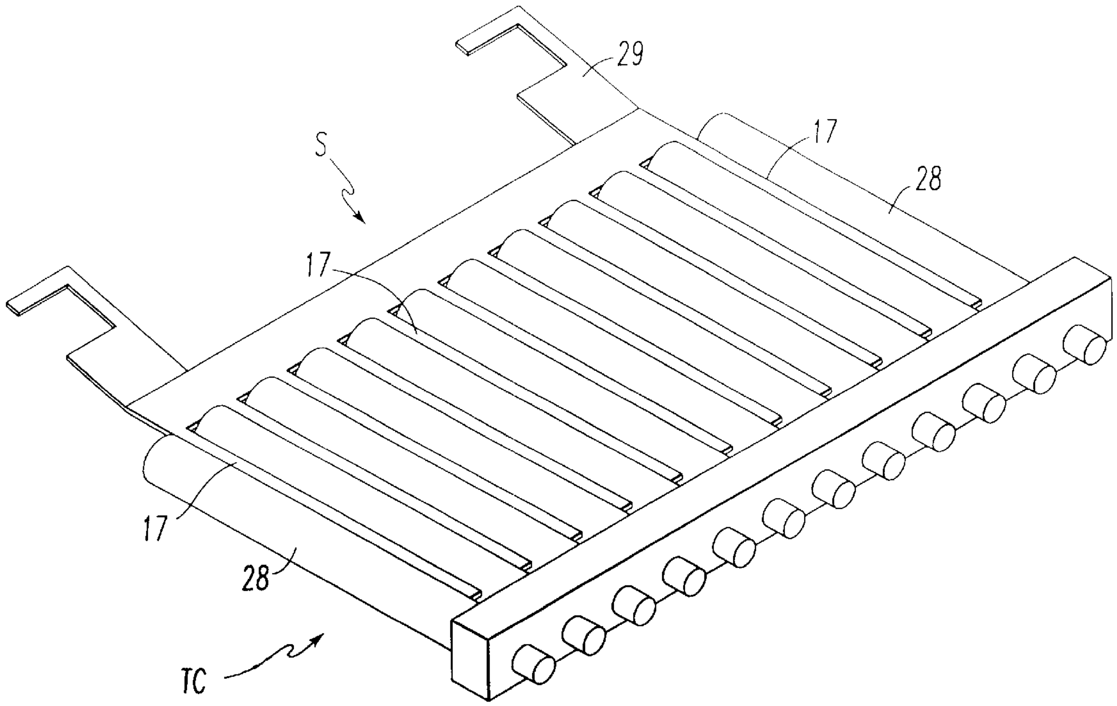
FIG. 6 is a top perspective view of the interleaved shelf and conveyor structures of the present invention in the region of the staging towers.

The tower roller conveyors TC transport flats mail F through the tower assembly 16. The shelves S include outwardly projecting fingers 17 which are designed to interleave with and pass through a plurality of cantilever mounted rollers 28 of the conveyor TC as illustrated in FIG. 6, allowing the shelves S to lift flats off the rollers 28 of the conveyor TC. This will place the flats F onto or off of the rollers as the shelves S are indexed down or up, respectively. The rollers 28 of the conveyor TC-16 are skewed to the direction of travel by 2 degrees, as illustrated in FIG. 4 to facilitate edge justification of the flats F against a C-shaped channel 30 for reliable mail orientation. An alternative configuration for the interleaved numbers 17 and 28 is shown in FIG. 5 where the finger members 17A and roller members 28A include transversely oriented projections P.

Figure 7:
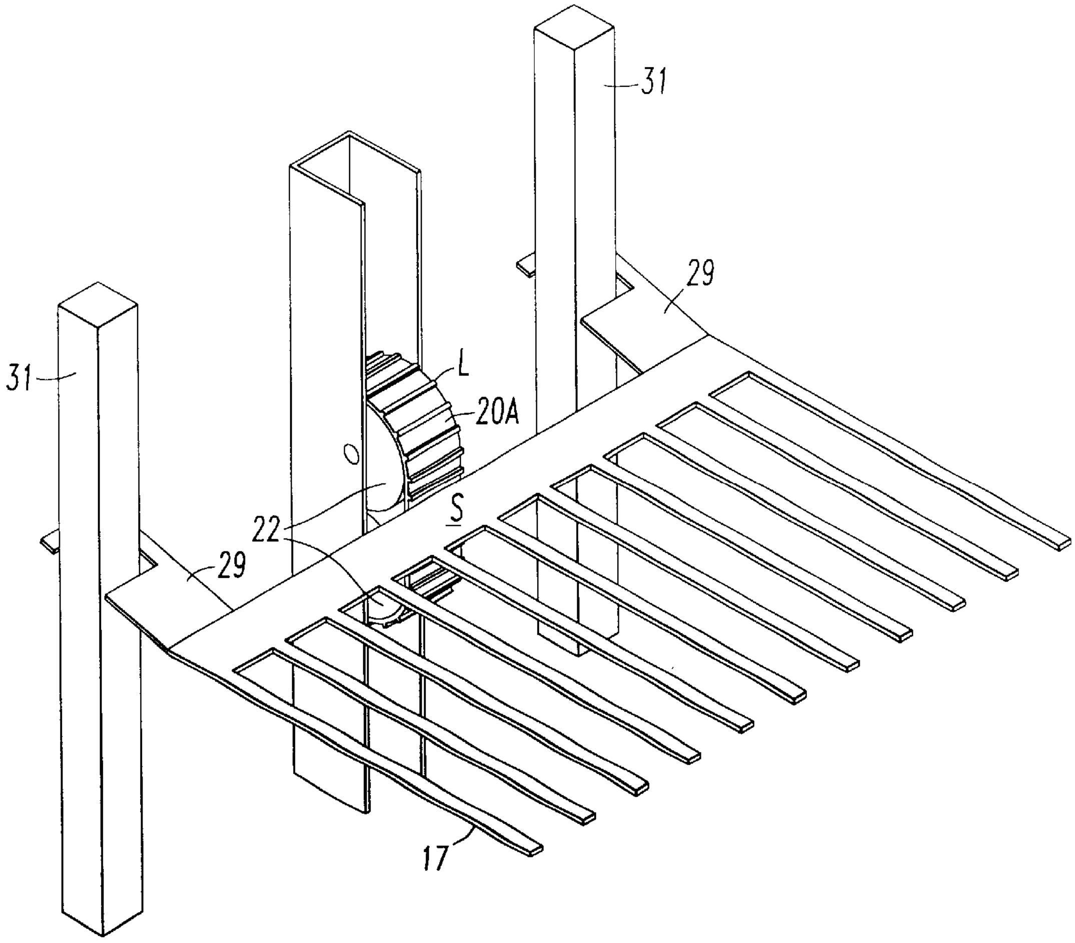
FIG. 7 is a perspective view illustrating a detail of the shelves within the staging towers and their operative association with the timing belts of the elevator mechanisms of the towers.

Tower shelves S are supported by a set of guides 31 as shown, for example, in FIG. 7 which engage slotted arms 29. Guides 31 maintain orientation and the belts determine the vertical position of the shelves S. Further as shown in FIG. 3, each staging tower, such as tower 16-1, has three zones 16A, 16B, 16C through which the shelves S move. 16A designates the shelf's storage zone, 16B the mail stream or transfer zone, and 16C the mail staging zone. Shelf position is determined by the operation of the respective endless timing belts 20A, 20B, 20B in the respective zones. Each shelf S is driven by a tooth or lug protruding from the endless timing belts in a manner illustrated in more detail in connection with FIGS. 7 to 9.

The timing belts 20A, 20B, 20C collectively constitute an elevator mechanism for raising and lowering the shelves S and flats F thereon within each tower of the tower assembly 16. Each timing belt comprises an endless belt with protruding lugs L thereon spaced in predetermined pitches which differ between the respective vertical zones between the tower. These endless belts are wound around pulleys 22. Pulleys 22 are driven by the drive mechanism in zone 16. As depicted in FIG. 3A, the drive mechanism includes an electric motor EM coupled to drive shafts 26 via a chain and sprocket drive assembly 24. The respective endless belts of the timing belts are wound around the drive shafts 26 and are selectively driven in response to rotation of those shafts, which are under control of the central computer of the system to be described further hereinafter.

Figure 8:
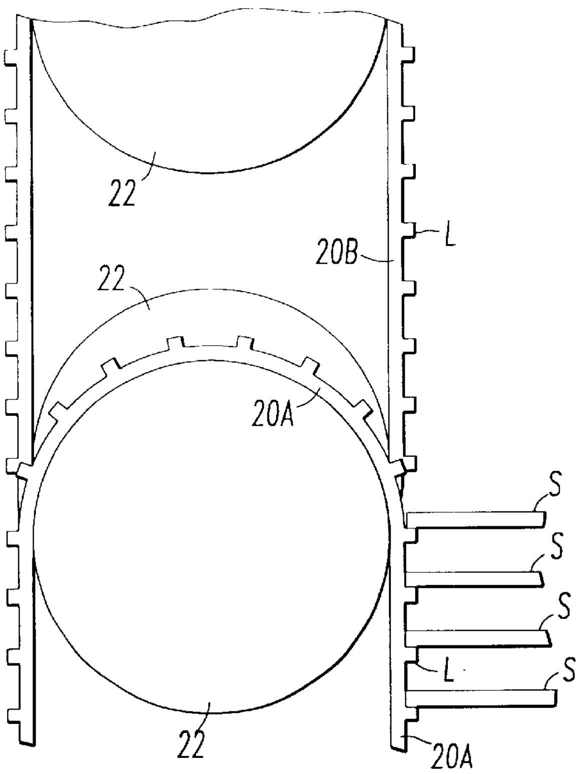
FIG. 8 is a side elevational view illustrating the shelf transfer from one belt to another of the elevator mechanism.

In the transition zones between the respective timing belts, the shelves S are moved up and down the support guides 31 and are transferred from one belt to another. The shelves S are engaged by the lugs L on the respective timing belts to effect movement and transfer of the shelves from one belt to another. When a shelf S comes to the top of a zone, its supporting belt curves around a pulley 22. As the shelf S rises, its support tooth or lug L begins to disengage from the shelf S. There is a large window of time when the support tooth or lug is still supporting the shelf, but the tooth or lug above the shelf no longer restricts the shelf from traveling up. In this window, a tooth from the belt in the next zone rises to lift the shelf S from the first zone to the next within the tower 16. This transition from one zone to another is depicted in FIGS. 8 and 9.

Figure 9:
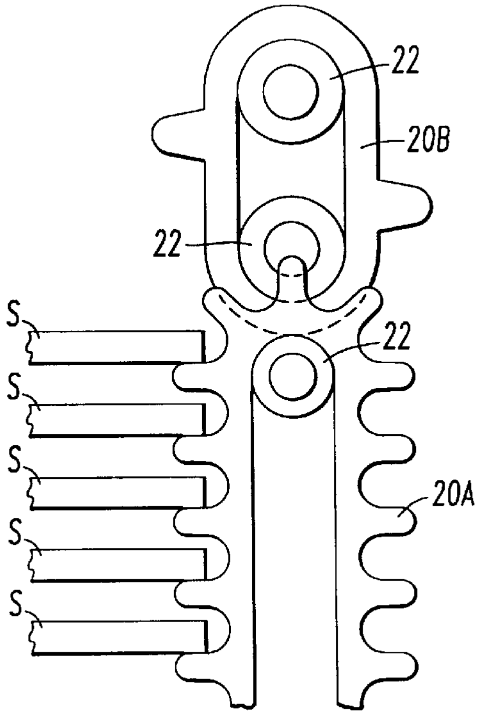
FIG. 9 is a side elevational view showing the transfer of shelves between the belts of the elevator mechanism in slightly more detail than illustrated in FIG. 8.

Referring to FIG. 9, timing belt 20A in the shelf storage zone, is a low-speed timing belt with a narrow pitch to accommodate a plurality of shelves S in close, juxtaposed, stacked positions. The timing belt 20B, in the transfer zone in the mail stream region of the towers 16, is a high-speed timing belt with a coarse or wide pitch between the lugs L. The pitch of the timing belt 20B is chosen to be wide enough to accommodate the maximum thickness of a piece of flat mail moving along the conveyor.

The upper timing belt 20C is not shown in FIG. 9 for clarity, but it preferably includes a low-speed timing belt with a pitch wide enough to accommodate both the shelves S and flats mail F disposed thereon.

As the staging towers are unloaded by the lowering of the shelves in the staging or storage zone 16C by selective operation of the timing belts under control of the central computer, a stream of flats mail arranged in delivery point sequence emerges from the staging towers and approaches the containerizers 18, which maintain the sequence of the stack.

Figure 10A:
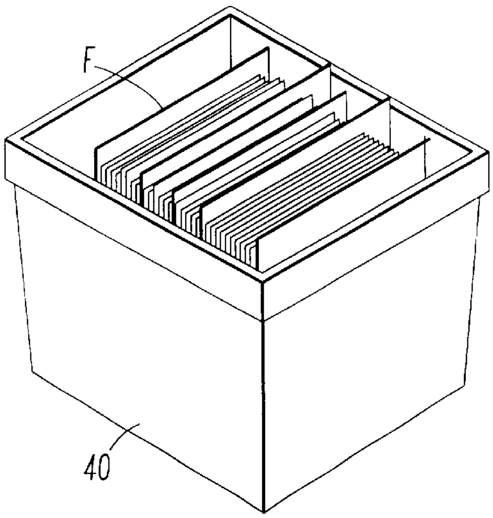
FIGS. 10A and 10B are perspective views illustrating two options of the present invention for storing mail in standard United States Postal Service mail tubs.
Figure 10B:
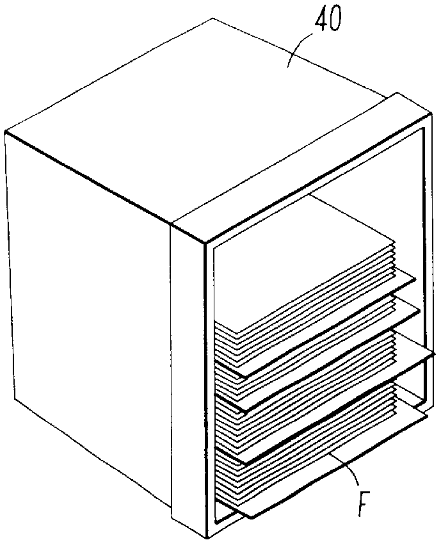

The flats may be stacked in mail tubs 40, either as illustrated in FIG. 10A with the edges facing up, or in FIG. 10B with the edges extending horizontally and vertically stacked. FIG. 10A depicts the flats mail being stacked on edge in a USPS mail tub 40. This method is desirable because it is a preferred arrangement for letter carriers, since the mail standing on edge in the tub is similar to the arrangement of file folders in a filing cabinet and lets the carrier flip through the mail easily. Optionally, the containerizer stacking arrangement illustrated in 10B can be used. This type of output gives a tub of mail that looks similar to the tubs produced by popular flats sortation machines for other types of mail.

Figure 11:
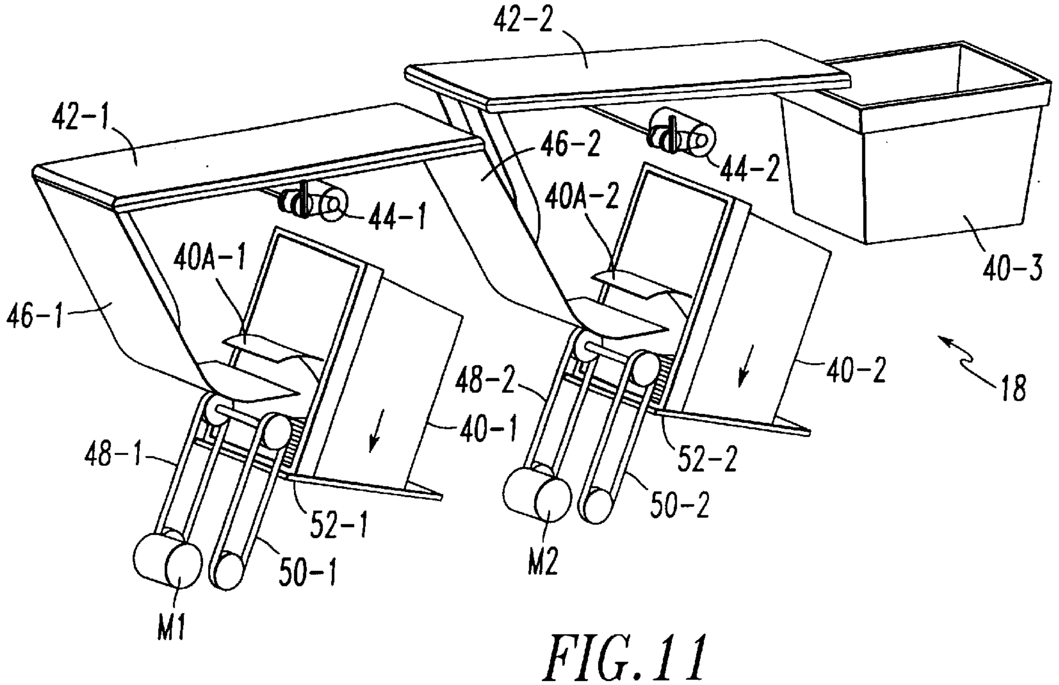
FIG. 11 is a perspective view of a dual containerizer module of the present invention and a reject tub.

As the flats mail F leaves the staging tower section 16 of the flats bundle collator, it enters the containerizer section 18 as shown in FIG. 11. Flats F are diverted into either of two output tubs 40-1 or 40-2. This diversion is achieved by movement of the pop-up conveyor sections 42-1 and 42-2 up or down in response to activation of fluid motors 44-1 or 44-2. This up or down movement of the conveyor section 42-1 or 42-2 permits the flats F to slide down one of the respective angular shoots 46-1 or 46-2, which communicate with the open sides of the mail tubs 40-1, 40-2. Each mail tub 40-1 and 40-2 includes an angular guide flap 40A-1 and 40A-2 in order to capture and guide the flats entering the tub for assembly into a stack. The shoots 46-1 and 46-2 constitute acceleration ramps, which are shaped to justify the flat to one side of the ramp. There flats F are accelerated to the end of the ramp where they enter either the tub 40-1 or tub 40-2, and slip onto the mail stack being formed therein as they are guided by the flaps 40A-1 and 40A-2. The relative height of the stack at the end of the acceleration ramp 46-1, 46-2 is controlled by sensing the stack height and indexing the tubs 40-1, 40-2 downward as the stack height grows. This indexing of the tubs 40-1 and 40-2 is affected by an elevator mechanism including motors M1, M2 and a plurality of belts 48-1, 50-1 driven by the motors M1, M2. The tubs 40-1, 40-2 are supported on the belts 48-1, 48-2, 50-1 and 50-2 at 52 by appropriate teeth or lugs protruding from the belt. A third tub 40-3 is provided at the end of conveyor section 42-2 for system rejects, which is selectively loaded by operation of the pop-up conveyor sections 42-1 and 42-2 described herein before.

Figure 12:
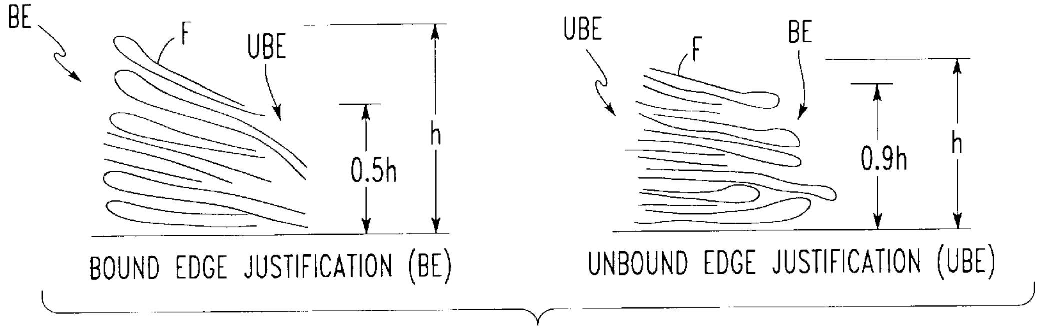
FIG. 12 is a diagrammatic end view of a preferred method of edge justifying flats mail in order to achieve a uniform stack profile.

Edge justification of the flats within the tubs is preferably performed by justifying the unbound edges of flats, rather than the bound edges. As the mail stack grows in height in a tub 40-1, 40-2, the uniformity of the stack is maintained by the tilt of the tub, and the type of edge justification. It is a discovery of the present invention that a stack of mail quickly becomes lop-sided if it is edge justified with the bound edge of the mail, which tends to be thicker than any other part of the flats mail. This phenomenon is illustrated in the diagrammatic illustration of FIG. 12, wherein the left-hand portion of the figure shows "bound edge justification" and the right-hand portion of the figure depicts "unbound edge justification". With the unbound edge justification the mail stack grows uniformly, as illustrated in FIG. 12, during testing stacks of mail which were 12" tall with bound edge justification and had an average height of 10¾" when justified by the unbound edge. Therefore, a stack of flats mail justified by the unbound edge is more compact and less lop-sided than one stacked by bound edge justification.

Figure 13:
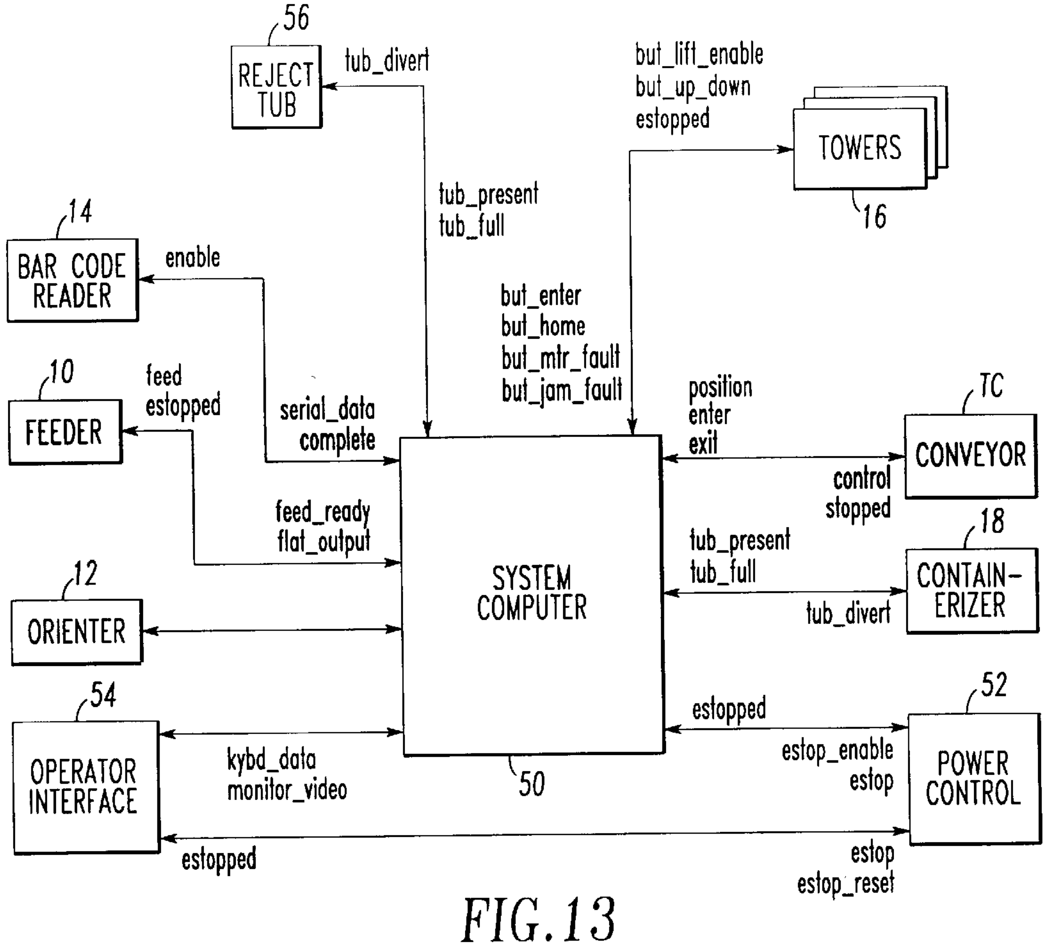
FIG. 13 is a block diagram of the hardware architecture for controlling the flats bundle collator system of the present invention.

The operation of the flats bundle collator of the present invention is controlled by a combination of hardware and software described in connection with FIGS. 13 to 19. Referring first to FIG. 13, which depicts the hardware architecture of the system of the present invention; a system controller 50 is the heart of the hardware and in a preferred embodiment is a commercially available IBM compatible, Pentium class computer, with monitor and keyboard. The various control devices are coupled to the system computer 50 and include an operator interface 54, and a power controller 52. The other operative components of the system including the feeder 10, barcode reader 14, staging towers 16, conveyor TC, containerizer 18, reject tub 56, and diverter module 12 are also operatively connected to system computer 50.

The system controller 50 is a computer containing the application programs and databases. It also contains a controller card for a commercially available high-speed daisy chain controlled bus. This bus is used throughout the system to activate and sense the other control components. For position tracking, the computer 50 also contains a counter card to interface with conveyor encoders to be described hereinafter.

The operator interface 54 allows the computer 50 to display information on its monitor to the operator and to receive inputs. The computer also includes a standard keyboard. Also included are emergency stop controls. These controls consist of buttons and indicators.

The power controller 52 provides the 3-phase electrical connection to the building power source. It includes power on/off indicators, circuit breaker protection, phase load balancing, and motor power emergency stop capability. The computer senses when an emergency stop has occurred. The components of the subsystem are located throughout the flats bundle collator modules, and will be described hereinafter with reference to FIGS. 20 to 23.

The feeder 10, described hereinbefore, interfaces with the computer 50 through a control bus in order to synchronize the feeder operation with the other components of the system.

The barcode reader 14 is a commercially available item as described hereinbefore. The computer 50 interfaces to the barcode reader 14 through the control bus.

The computer controls the operation of the mail transport conveyors TC. There are two independently powered sections. The first section TC-1 is located between the feeder 10 and the first staging tower 16. The second section TC-2 runs from the first tower 16 to the end of the system. To track mail position, the computer reads an encoder from each section. These encoders will be described further hereinafter with reference to FIGS. 20 to 23.

The staging towers 16 handle the insertion and extraction of mail pieces to the staging towers 16-1 to **16-*n*, wherein n represents the total number of modular staging towers assembled for a given configuration. Mail F is inserted or extracted by indexing the towers 16 up or down. Because this is a modular system, where additional towers can be added, the controls interface to the computer 50 is a commercially available control bus described hereinbefore. The computer 50 controls the indexing of the shelves S within the towers 16. It reads a sensor position on a conveyor and keeps track of the locations of mail pieces travelling on that section. The components of the staging tower 16** have been described hereinbefore and include a shelf lift motor, position sensors, limit switches, and override switches.

The containerizer module 18 is also coupled through the control bus to the system computer 50. This provides the controls for the loading of the mail pieces into the output tubs 40-1, 40-2. The computer 50 diverts the conveyor section to pass the mail into a tub 40 or allows it to continue along the conveyor through the use of the pop-up conveyor sections in containerizer 18. The elevation of the mail tub is controlled locally and the operator has manual override controls. The computer 50 senses when an output tub is present and when it is full.

The reject tub 56, receives nonconforming mail pieces. It is similar to the mail tubs 40 and is illustrated at the output of the containerizer module 18 in FIG. 11. The elevation of the reject mail tub 56 is controlled locally and the operator has manual override controls. The computer 50 can sense when a reject tub is present and when it is full. The components include a tub elevation motor, position sensors and indicators, limit switches and override switches.

All of the control hardware of the system, illustrated FIG. 13, is run by appropriate software architecture. The computer 50 runs under the standard Microsoft NT operating system, with a commercially available real-time kernel. Parts of the application software are interrupt driven, from the conveyor encoders, and need to be executed soon after they interrupt the curves. Because NT is not a true real-time operating system, it does not have a consistent or fast capability in this area. The purpose of the real-time kernel is to provide this capability. Application software is programmed using high-level Microsoft C/C++ language using standard coding practices.

The operator O interacts with the system using the computer 50, its associated keyboard and monitor, and the feeder control panel. There are also emergency stop buttons within easy reach. Operator displace grains conform to standard usage guidelines and lead the user with appropriate prompts through the task to perform.

Figure 14:
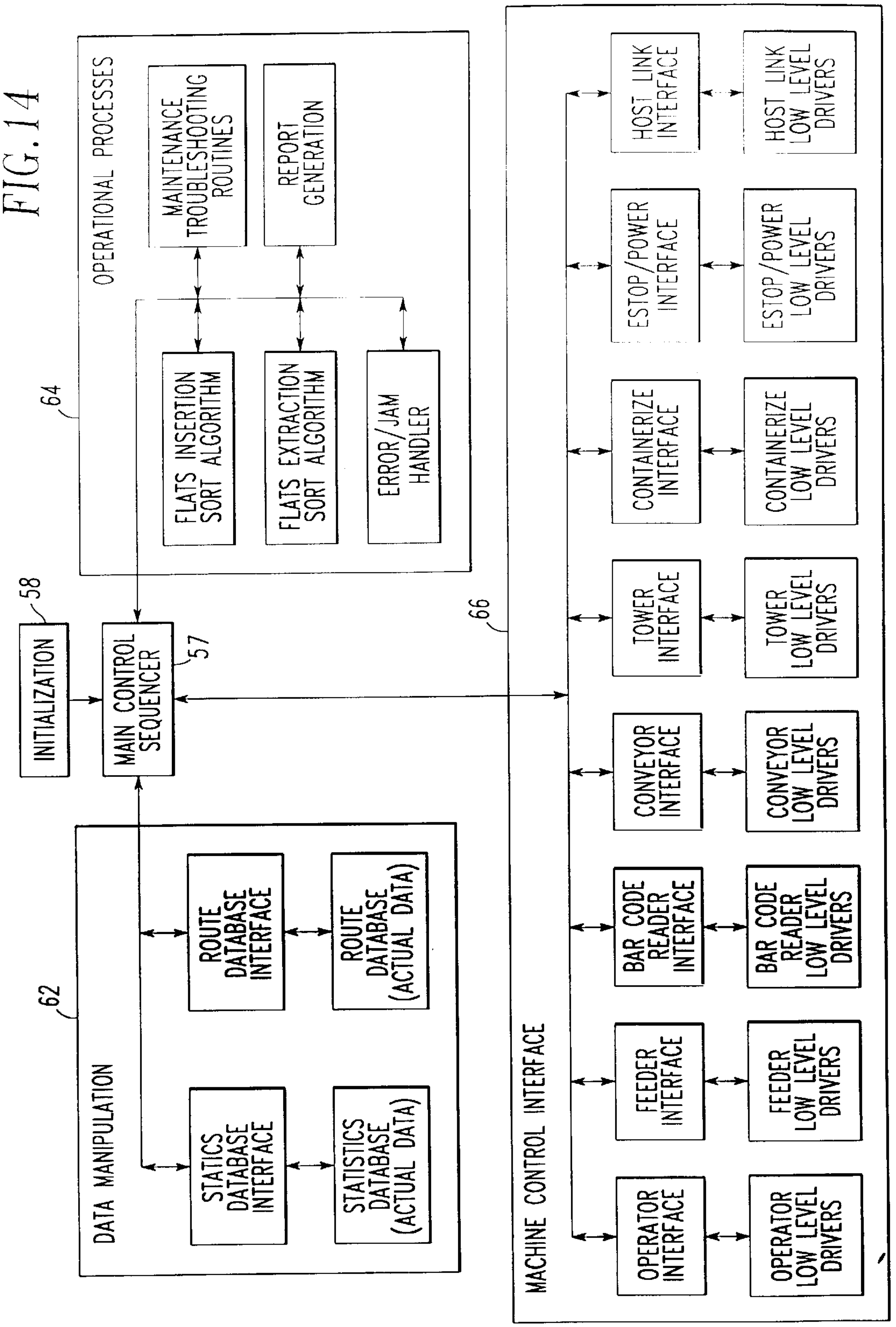
FIG. 14 is a block diagram of the software architecture for controlling the hardware of FIG. 13.

The application software is grouped into modules illustrated in FIG. 14. These modules include a main control sequencer (software of computer 50) 57 initialized by appropriate initialization procedures 58, a data manipulation module 62, operational process module 64, and machine control interface modules 66.

After power on and computer initialization is effected by procedures 58, the application program is automatically started. Initialization includes the tasks such as reading hardware sensors, and setting actuators, setting software data tables and configurations. The main control sequencer software 57 is then started.

The main control sequencer software 57 has primary control over all the tasks to be performed. It starts tasks, controls the sequence of events, and stops tasks. The type of tasks performed include; user logon/logoff, accessing carrier route data for display or update, initiating carrier route sortations, generating reports, accessing machine performance statistics, and initiating maintenance tasks.

The machine control interface software modules 66 are the interface and low level drivers for the system. These are used by the software to sense and control the operation of the hardware components of FIG. 13. Examples of these operations include: feed a single mail piece; start conveyor section one; and check to see if the mail output tub is full.

The data manipulation software 62 handles the storage and retrieval of various types of data. Examples of this data include: number of stops on a route; the DPS code for each stop on a route, in order of delivery; the number of pieces misread by the barcode reader; and total number of mail pieces fed by the feeder. The operational processing software modules 64 handle the operations associated with several larger tasks. These are identified in each of the blocks within block 64 in FIG. 14, and include: flats insertion sort algorithms; flats extraction sort algorithm; error/jam handler; maintenance trouble-shooting routines; and report generation.

As the main control sequencer software 57 executes, it calls functions in the various modules. The hardware 50 and software 57 work together to lead the operator through the completion of desired tasks.

Figure 15A:
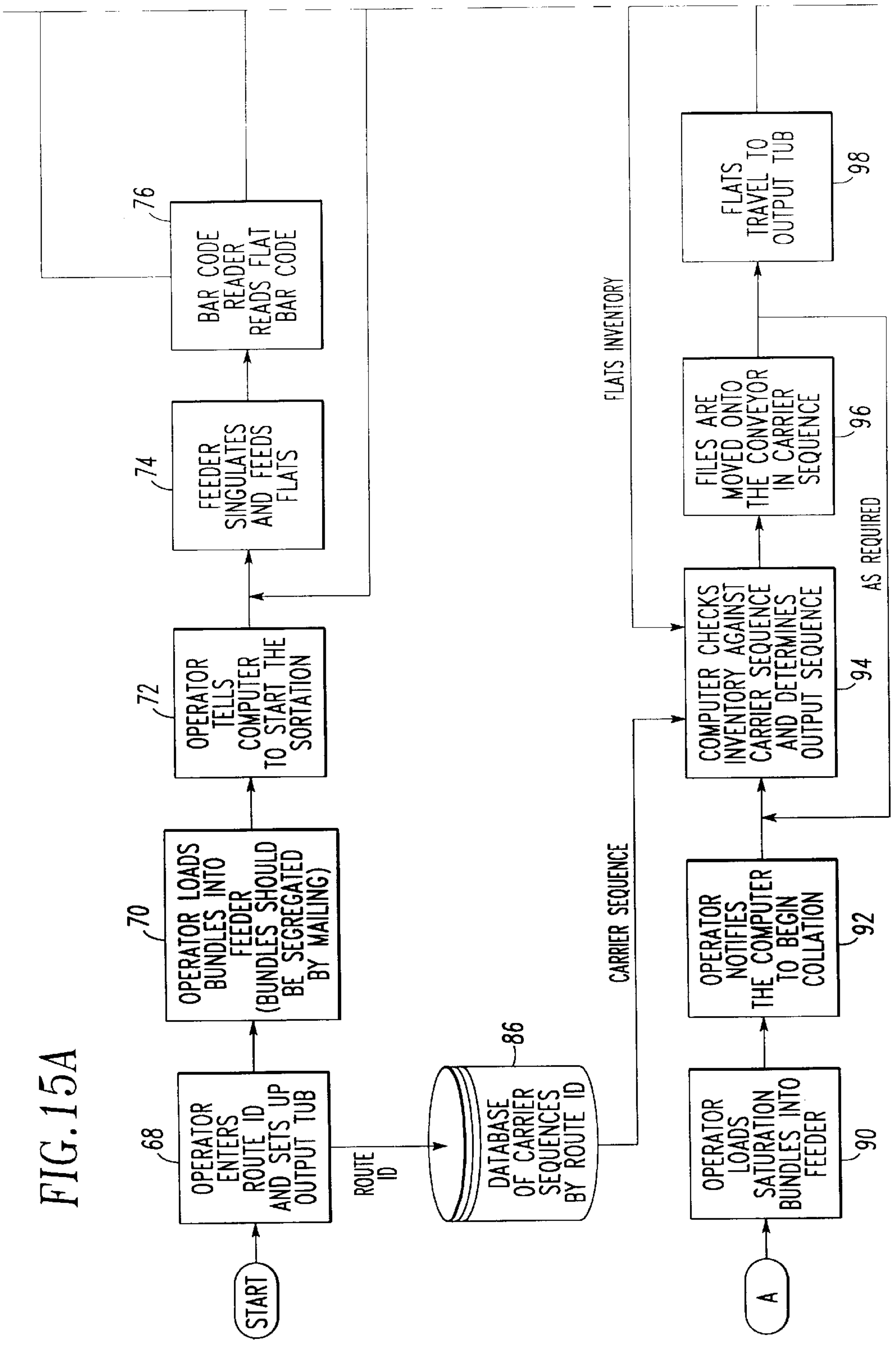
FIGS. 15A and 15B are illustrative of an operational block diagram of the method performed by the flats bundle collator system of the present invention.
Figure 15B:
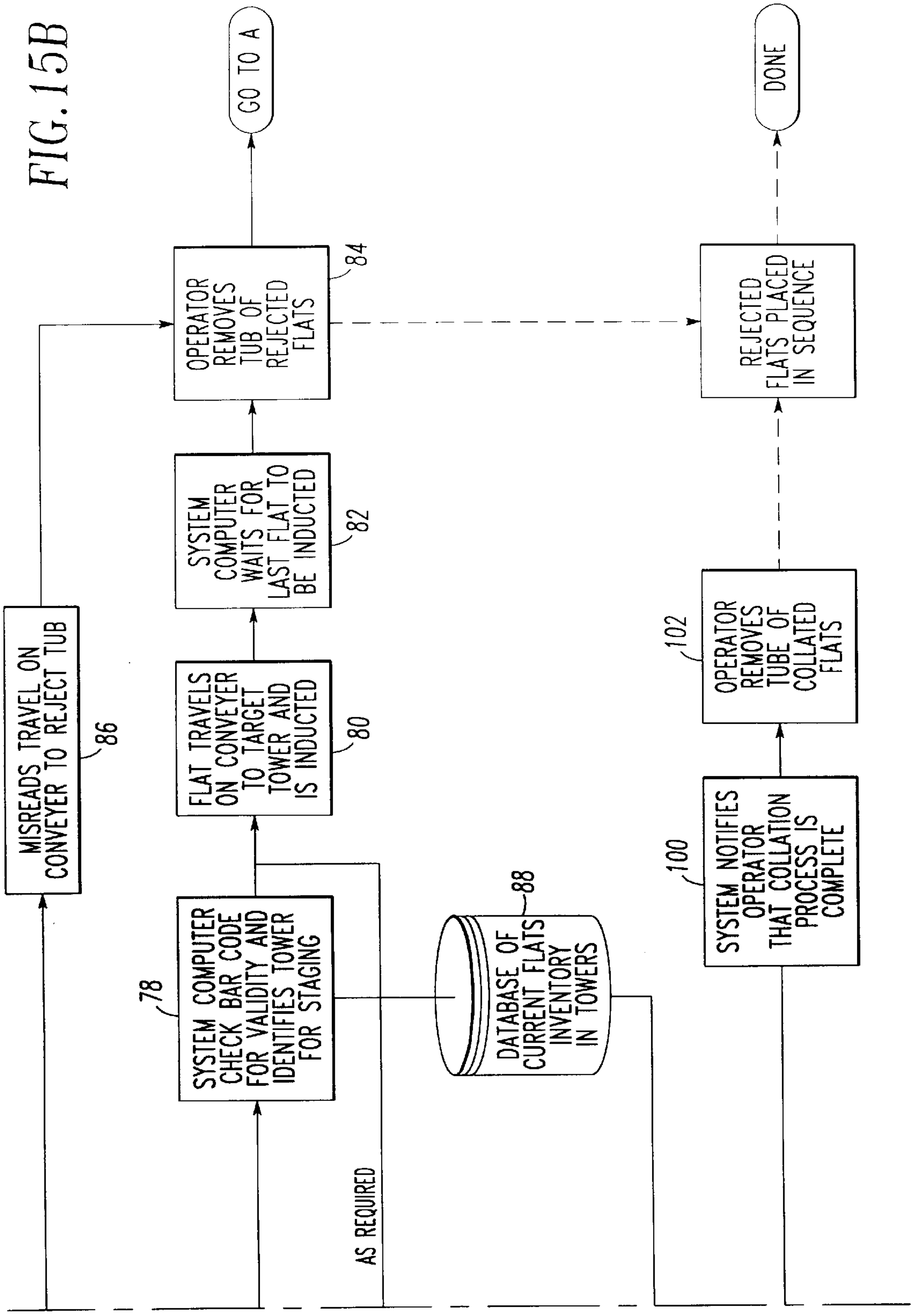

The overall operation of the flats bundle collator system of the present invention is illustrated in the block diagram of FIGS. 15A and 15B. A typical carrier route sortation includes the following sequence of steps. At the start, in step 68, the operator enters the route ID and sets up an output tub 40-1 or 40-2 to be filled. This data is stored in database 86 and fed to the computer 50 for processing at step 94 to be described hereinafter. In step 70, the operator loads the bundles of flats into the feeder 10. The bundles are separated according to mailings. In step 72, the operator tells the computer 50 to start the sortation. In step 74, the feeder 10 singulates and feeds the flats F to the diverter module 12. In step 76, the barcode reader 14 reads the barcode on the flats F, including the delivery point sequence (DPS), namely, the walk sequence of the route carrier (WS). In step 78, the system computer 50 checks the barcode for validity and identifies the tower for staging. This information is stored in the database 88 for comparison with the database 86 at step 94 by the computer 50. In step 80, the flats F travel on the conveyor to the target tower 16 and are inducted therein. In step 82, the system computer 15 waits for the last flat to be inducted into the towers 16. In step 84, the operator removes tub 56 of rejected flats, which have been processed in step 86 to include misreads on the conveyor placed in the reject tub. The process continues onto Routine A in FIGS. 15A and 15B.

In step 90 of routine A, the operator loads saturation (mass mailing) bundles into the feeder 10. In step 92, the operator notifies the computer 50 to begin collation. In step 94, as described hereinbefore, the computer 50 checks the inventory in the towers against the carrier sequence and determines the proper output sequence. In step 96, the flats F are moved onto the conveyor TC in carrier walk sequence (WS). In step 98, the flats F travel to a selected one of the output tubs 40-1, 40-2 in containerizer module 18. In step 100, the system notifies the operator that the collation process for unloading tower 16 is complete. The operator in step 102 removes the tub of collated flats and substitutes the next tub to be filled. In step 104, any rejected flats in the reject tub 56 are manually placed in proper sequence for the mailings. This completes a typical operational scenario for the collation of a carrier's route of flats mail.

There is a simple order in which the mailings are fed through the FBC of the present invention. If there is a mailing with pieces thicker than 0.375", the operator feeds those first. The normal thickness mailings are fed next. If there is a saturation mailing, it is fed last. This provides better utilization of the tower capacity. The saturations are fed last, because they can be collated directly from the feeder 10 and do not have to be stored in the tower 16. This increases the actual capacity of the system, as well as increasing the system throughput.

Figure 16:
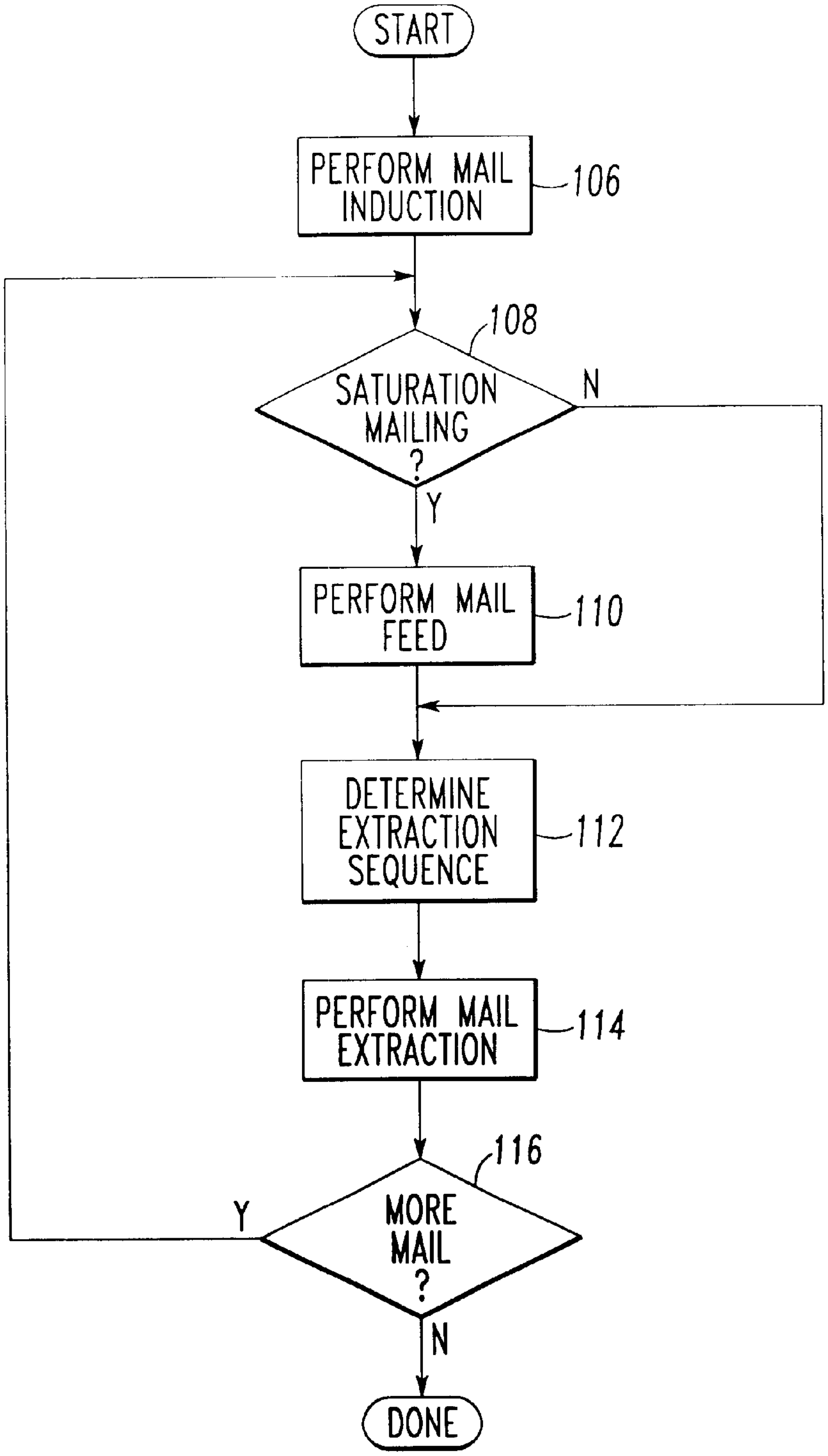
FIG. 16 is a flowchart of the collation logic software of the flats bundle collator system of the present invention.

The FBC system operation consists of two phases. During the induction phase, mail pieces are fed into the system and stored in tower locations 16. During the collation phase, an algorithm determines the extraction sequence; mail pieces are extracted from their storage locations in towers 16 and placed in a selected one of output mail tubs 40-1, 40-2, 56. If a saturation mailing is to be sorted, it is fed into the system during the collation phase. As the regular pieces are extracted, the system intermingles the saturation pieces at the proper times to achieve the desired output sequence. This allows the system to handle a larger volume of mail and have higher throughput. A flowchart of the coordination of the induction and collation phases of the system of the present invention is illustrated in the flowchart of FIG. 16. At the start, in step 106, mail induction is performed. At this point, the operator has selected the carrier's route. The computer 50 has retrieved this route information from the internal databases and performed necessary utilizations.

In step 106, the operator places the mailings into the feeder. If there is a saturation or other large mailing, the operator will feed that during the performed mail extractions, step 114, to be described hereinafter. As each piece of mail F is fed, it is read by the barcode reader 14 and its carrier stop is determined from the database. Starting at the first upstream tower 16-1, the computer 50 examines the carrier stops of the last piece in each tower. It determines the tower whose last piece is closest, but still earlier, to the fed piece and sends the pieces down the conveyor to be conducted into that tower. All barcode misreads and pieces that the system is unable to stage are sent to the reject tub 56, as illustrated in FIG. 15. This operation continues for all non-saturation pieces.

As pieces are fed, the computer 50 tracks where each piece goes and all other relevant information about it. When all of the non-saturation pieces have been fed, the operator informs the computer and loads the saturation, or large mailings, as illustrated in Routine A of FIGS. 15A and 15B. This is done at the beginning of the collation phase.

Returning to the description of the flowchart of FIG. 16, step 108 is a decision block as to whether or not a saturation mailing is being processed. If "NO", the process proceeds to step 112 to determine the extraction sequence. If "YES", the process proceeds to perform mail feed at step 110. In step 110, this function is only performed if there is a saturation or large mailing. If a piece needs to be fed, the feeder will feed pieces until the barcode reader 14 has read a valid piece for the carrier's route. This piece travels down the first conveyor connected to the output of the feeder 10 and stops just before the first upstream tower 16. At this time, the feeder 10 will stop feeding the pieces. This piece remains stored at the end of the first conveyor TC-1, until the computer determines that it needs to be extracted, and placed on the second conveyor TC-2, to be sent directly to a selected one of the output tubs in containerizer module 18. In step 112, the determination of the extraction sequence consists of several steps. The end result is an ordered list describing the extraction and move events. This list begins with the current events and continues until the last piece is placed in the tub selected.

Figure 17:
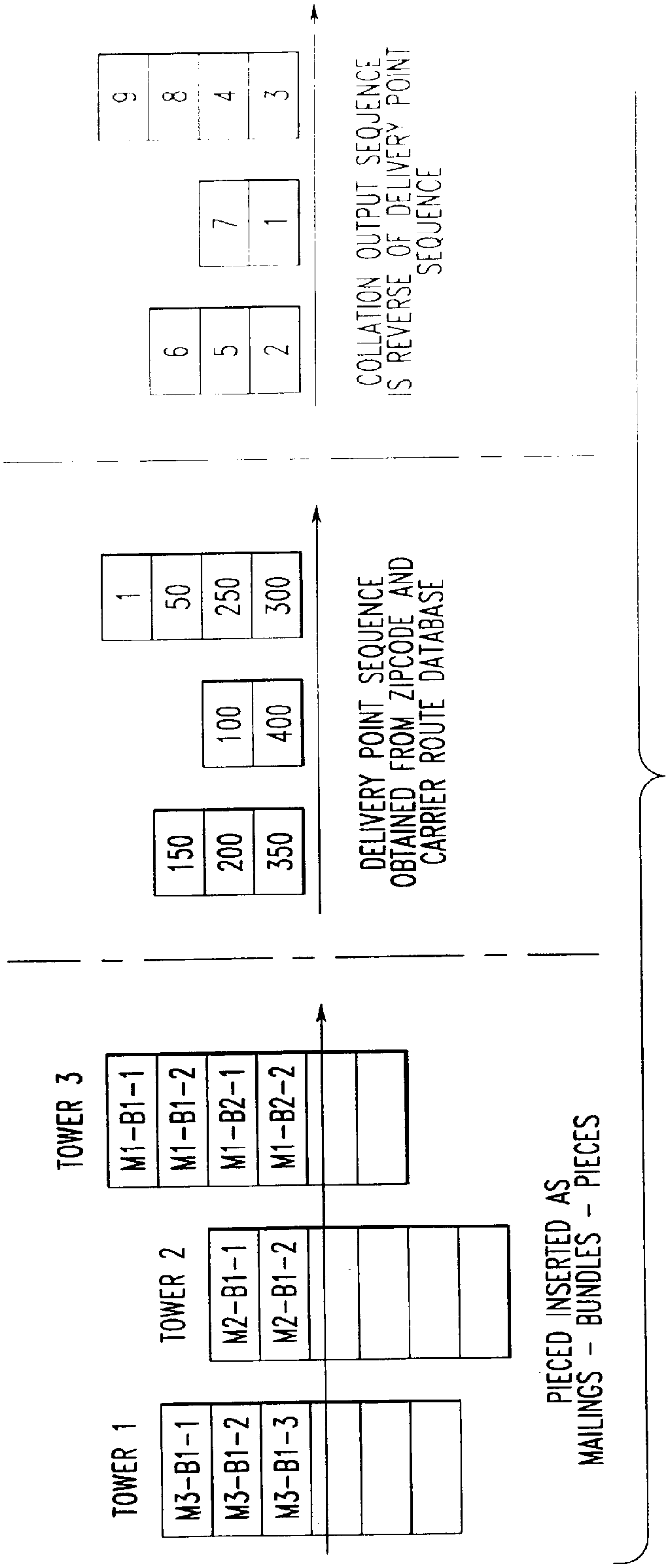
Figure 19A:
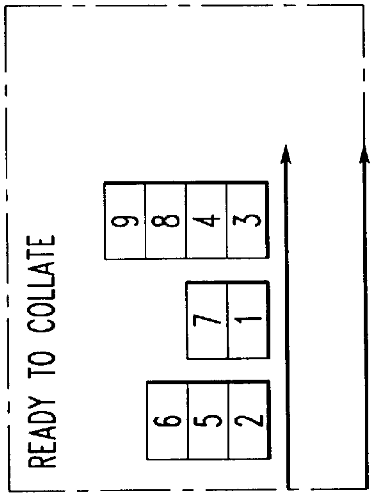
Figure 19B:
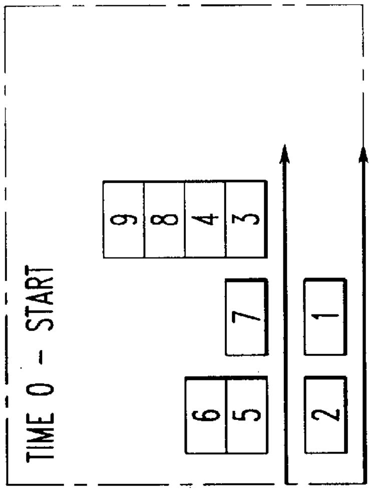
Figure 19C:
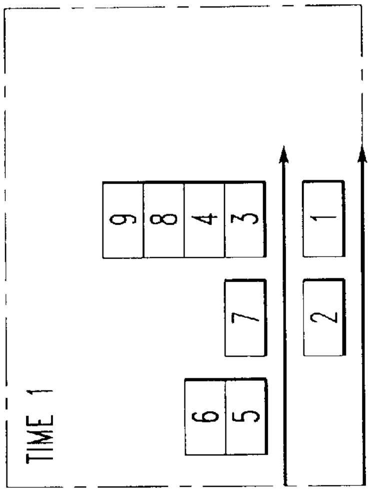
Figure 19D:
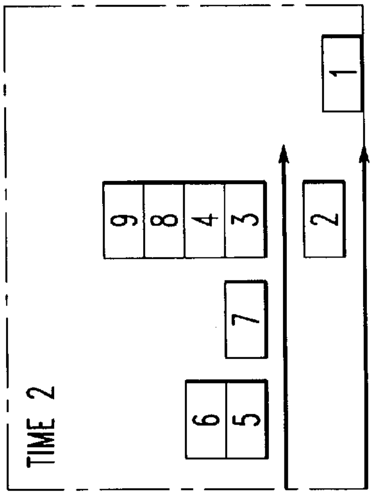
Figure 19E:
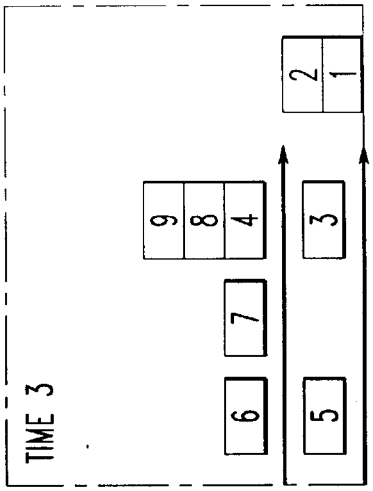
Figure 19F:
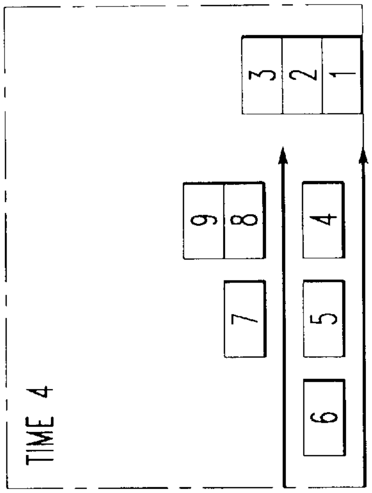
Figure 19G:
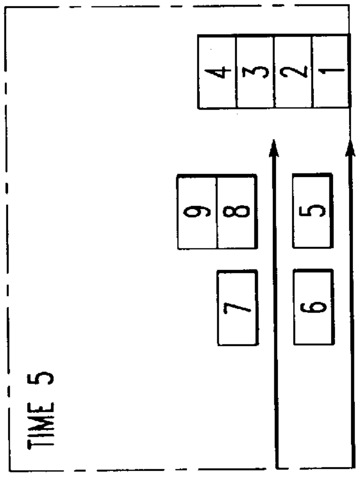
Figure 19H:
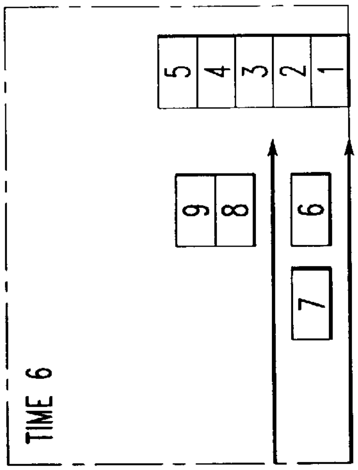
Figure 19I:
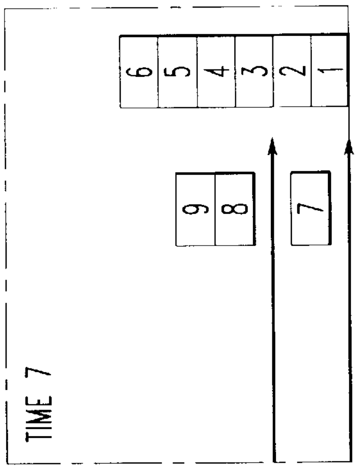
Figure 19J:
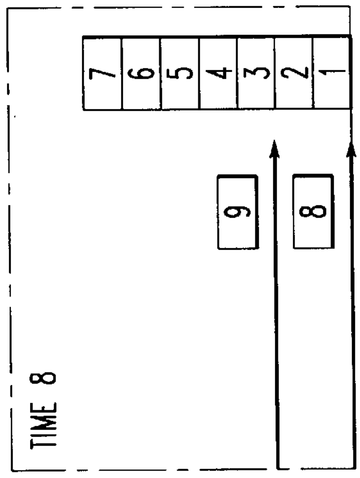
Figure 19K:
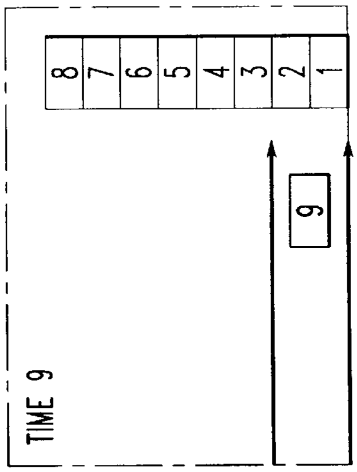
Figure 19L:
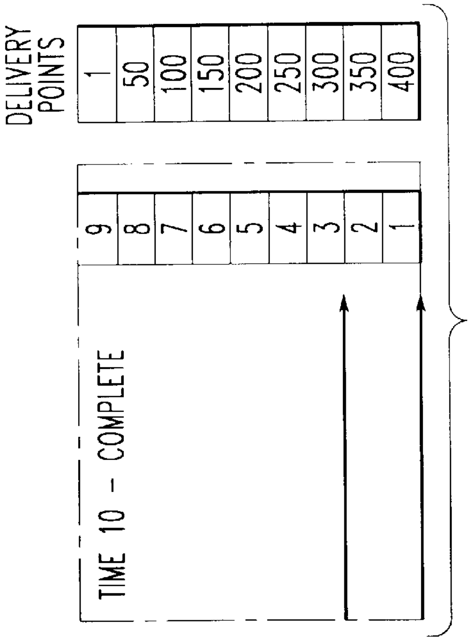

A general indication of the flow of mail is illustrated in FIG. 17. This figure depicts only three towers for simplicity to provide a coherent overview of the collation of pieces of mail through the system. In the left-hand portion of FIG. 17, the three towers are indicated as Tower 1, Tower 2, and Tower 3. In each tower, the pieces of mail are inserted as designated mailings M, bundles B, and pieces, represented by a numeral, 1, 2, 3, etc. As indicated, Tower 1 includes mailings M3, bundles B1, and pieces 1, 2 and 3 of those mailings and bundles. Tower 2 stores mailings M2, bundles B1, and pieces 1 and 2. Tower 3, stores mailings M1, bundles B1, and B2, and pieces 1 and 2 from the respective bundles.

In the middle section of FIG. 17, the mailings, bundles, and pieces of the left-hand section are designated by the delivery point sequence numbers (carrier walk sequence) obtained from the ZIP code on the pieces of mailing as read by reader 14. It can be seen that the pieces are stored in descending order from bottom to top in the respective towers in the walk or delivery point sequence.

FIG. 17 depicts the collation output sequence of the pieces of mail, which is in reverse of the delivery point or walk sequence in the center portion of the figure.

Returning to the flowchart of FIG. 16, in step 112, the determination of the extraction sequence consists of several steps. The end result is an ordered list describing the extraction and move events. The list begins with the current events and continues until the last piece is placed in the output tub.

In step 1, the carrier's walk sequence is stored in the system database. Using this sequence and the known piece information, the algorithm calculates through all available pieces and creates an output sequence table illustrated in FIG. 18A. This table shows the sequence each piece will be in, in the final output stack and the pieces' current location. The collation rules are illustrated in the left-hand column of FIG. 18, the sequence number in the next column, the current time in the next column, the calculation in the next column, and the resulting feed time in the final column. The last piece to be delivered by the carrier will be the first piece into the selected mail tub.

Exactly what time to extract a mail piece from its storage location is dependent on several factors. If the current piece tower 16 is downstream from the previous piece tower, then the current tower has to postpone extraction until the previous piece has passed by. If the current piece tower is upstream from the previous piece tower, then the current tower may possibly extract before the previous piece is extracted, because current piece will be on the conveyor for some time before it reaches the previous piece's tower. The algorithm steps through each piece in the output sequence table of FIG. 18A and calculates an extraction time for each piece. The extraction time computed is listed in the output sequence table of FIG. 18B.

Referring again to the flowchart of FIG. 16, the program proceeds to step 114; perform mail extraction. In this step, which is completely illustrated in the diagrammatic sequence of extraction steps of FIGS. 19A to 19L, the extraction events in the extraction time list of FIG. 18B are performed. This places one or more pieces of flats from the tower 16 on the second conveyor section TC-2, as illustrated in the steps of FIG. 19. The mail pieces are numbered in FIG. 19 in correspondence to the numbers assigned in FIGS. 17, 18A, and 18B described hereinbefore.

In the final step of the flowchart of FIG. 16, the computer 50 at step 116 checks to see if there is more mail in the system to be processed. If there is, the computer needs to get ready to perform another extraction of mail. At this point, the routine is done and the collation of this particular carrier's mailings is complete. The operator can then start another carrier's route and the input associated bundles of mail therefor.

Figure 20:
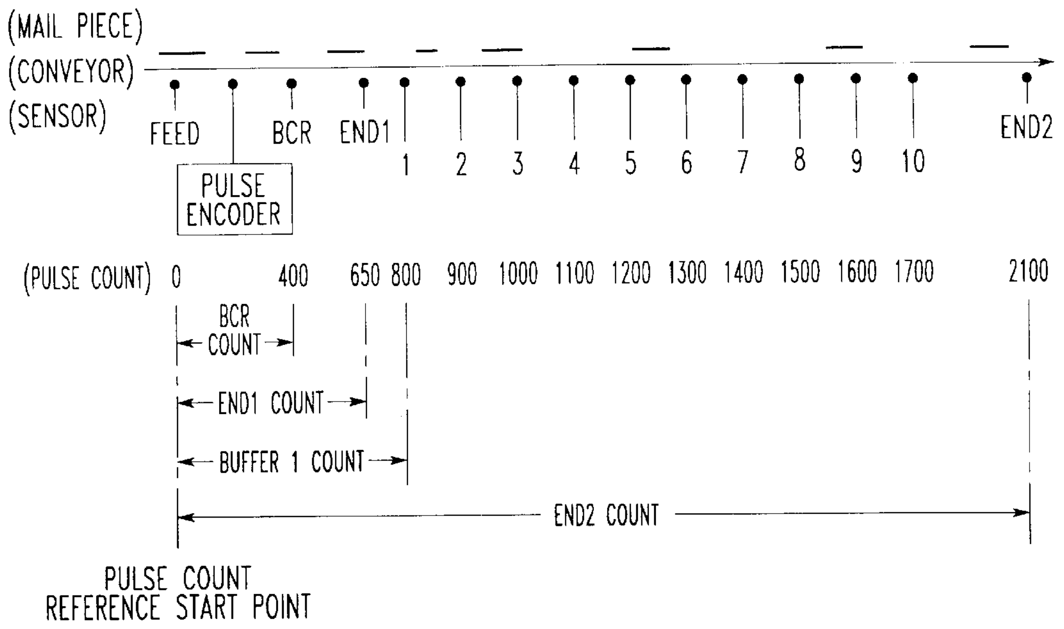
Figure 23:
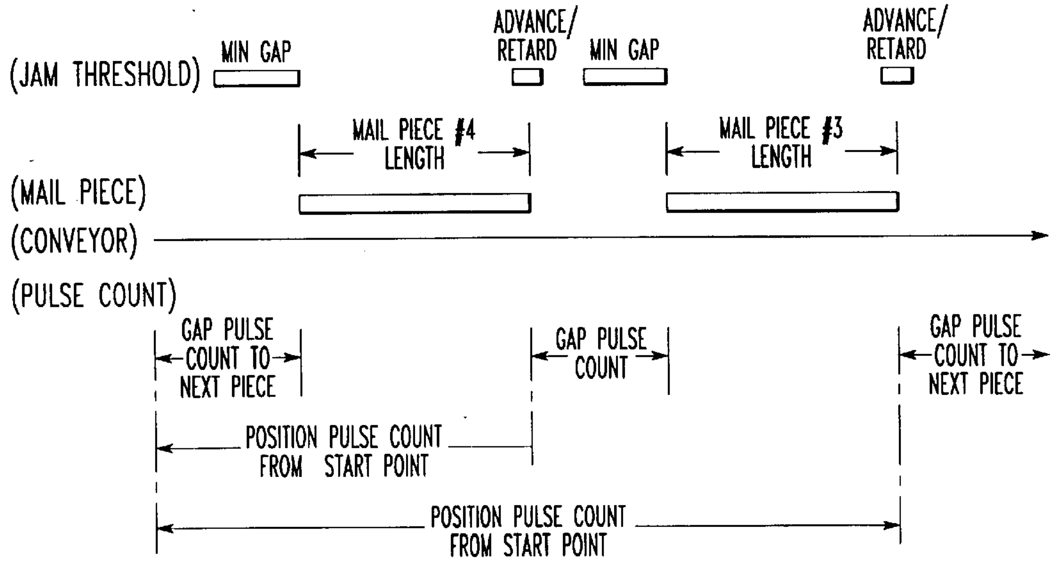

Referring to FIG. 20, there is illustrated in diagrammatic form, tracking information for the pieces of flats mail passing through the system; and FIGS. 21 and 22 illustrate tracking data obtained from the system of FIG. 20. FIG. 23, in conjunction with FIGS. 20 to 22 illustrate how a jammed condition of flats mail can be detected in the system of the present invention.

As pieces of mail travel along the conveyors TC-1 and TC-2, the computer 50 needs to track where they are. It needs to know when a piece is at a tower 16 and can be inserted into that tower, when a piece is not at a tower and one can be extracted, and when a piece did not arrive when it was supposed to and may be jammed. There are two types of hardware in system of the present invention used for tracking mail, namely, pulse encoders PE and photo sensors PS. Each conveyor section TC-1, TC-2 has an encoder PE that generates a pulse as the conveyor system moves. There are a fixed number of pulses during an inch of conveyor travel. Therefore, by counting pulses, the computer 50 can determine how far along the conveyor TC-1, TC-2 a piece should have traveled. Since the position is derived directly from the conveyor, instead of by timing the pieces based on a speed calculation, the system automatically accounts for start and stop accelerations, as well as running speed variations.

Several photo sensors PS are placed along the conveyor to detect when a piece F actually passes by. They are spaced such that only one mail piece F would be between them. The distance from the feeder 10, for each sensor, can be determined and expressed as a number of encoder pulses from pulse encoder PE. This hardware provides information on where the piece should be and where it actually is or is not to the computer 50. This tracking information is illustrated in the tables of FIGS. 21 and 22.

When a piece of mail is fed, the software adds information about the piece to a temporary tracking table. As the piece travels along the conveyor, the table in FIG. 21 is updated. This is used to track the piece and detect abnormal conditions. The table in FIG. 22 includes information such as the last known position of the piece, the next expected sensor position, the gap between adjacent pieces, and the destination tower for that piece.

Because the mail pieces are not physically constrained on the conveyors TC-1, TC-2, they may slip and move slightly slower than the conveyor itself. At a given sensor PS, this effect appears as a larger actual pulse.

The system is very tolerant of slippage because it initiates tower motion based on the actual location of the piece. If the difference in pulse counts from the encoders is too large or the gap too small, then something significant must have happened to the piece, which is interpreted as a jam condition. The test threshold conditions for determining a jam are illustrated in FIG. 23. When a jam condition is detected, the computer 50 stops the system and describes the problem to the operator. In addition, there are a series of indicator lights along the length of the machine. These will light at the location of the jam. When the operator has cleared the jam condition, he/she notifies the computer to continue with the sortation.

The present invention has been described for sorting flats mail, which are the preferred items to be collated. However, other items of manufacture requiring orderly sequencing could be sorted in accordance with the present invention, such as circuit boards, and other electrical components.

What is claimed:

1. A computer program embodied in a machine-readable medium for collating a plurality of items into a final sequenced set of the items, reflecting a prioritized order from items fed from an input stream to a staging station, the program comprising:

a) a segment for sorting the items at the staging station into a plurality of subsets of items sequenced into an intermediate order which is different from the prioritized order and the order input to the staging station as an intermediate step to achieving said final sequenced set, said staging station having a plurality of storage units $X_1$ to $X_n$, wherein n is the total number of storage units, said storage units temporarily storing said items in said subsets by;

1) a segment for controlling the insertion of each item into any selected one of said storage units $X_1$ to $X_n$ in accordance with an insertion plan algorithm consistent with an extraction plan algorithm for the items from those storage units for achieving the prioritized order of the final sequenced set of items; and 2) a segment for selectively extracting the items from any selected one of the storage units $X_1$ to $X_n$ according to said extraction plan algorithm; and b) a segment for controlling merging of the extracted items into a single output stream from the respective subsets of items in said final sequenced set.

2. The computer program of claim 1 wherein the items input to the system are pre-sequenced in a prioritized order and the program has a segment for inputting the prioritized order and an identity of each order into a computer as parameters in the sorting segment.

3. The computer program of claim 1 comprising segments for solving said insertion and extraction algorithms by, detecting position sequence order information of each item input to the staging station to develop an inventory of items being input, and computing on the insertion and extraction algorithms as a function of feed time and storage unit position of items actually stored in the storage units, and to be extracted therefrom.

4. The computer program of claim 1 wherein said items are mail items, the prioritized order is a walk order sequence of mail for a given mail carrier route, and the final sequenced set is a predetermined delivery order sequence for the given carrier route.

5. The computer program of claim 4 wherein said algorithms determine what time to extract a mail item based on its storage location wherein, if the current mail items being extracted is in a downstream position from the storage unit of the previously extracted mail item, then the current storage unit from which the mail item is to be extracted has to postpone extraction until the previous mail piece has passed by, and then if the current storage unit from which a mail piece is to be extracted is upstream from the previously extracted storage unit, then the current storage unit may extract a mail item before the previous mail item is extracted.

6. The computer program of claim 5 wherein the algorithms calculate the extraction time from the respective storage units of each mail item therein according to the following collation rules which determine the next sequence number of an item to be extracted as follows:

a) if the next sequence is in the same storage unit, then the extraction time of that item is the current time+1;

b) if the next sequence number is upstream of the current storage unit from which an item is being extracted, then the extraction time is the current time (minus)−(difference in current and next storage unit−1); and c) if the next sequence number is downstream of the current storage unit from which an item is being extracted, then the extraction time is the current time (plus)+(difference in current and next storage units+1).

7. The computer program of claim 6 including further segments for measuring the distance between mail items being transported, and generating a signal indicating a jam condition of the mail items if the distance between any two or more mail items is outside of a predetermined range of distances.

8. A computer program embodied in a digital signal for collating a plurality of items into a final sequenced set of the items, reflecting a prioritized order from items fed from an input stream to a staging station, the program comprising:

a) a segment for sorting the items at the staging station into a plurality of subsets of items sequenced into an intermediate order which is different from the prioritized order and the order input to the staging station as an intermediate step to achieving said final sequenced set, said staging station having a plurality of storage units $X_1$ to $X_n$, wherein n is the total number of storage units, said storage units temporarily storing said items in said subsets by;

1) a segment for controlling the insertion of each item into any selected one of said storage units $X_1$ to $X_n$ in accordance with an insertion plan algorithm consistent with an extraction plan algorithm for the items from those storage units for achieving the prioritized order of the final sequenced set of items; and 2) a segment for selectively extracting the items from any selected one of the storage units $X_1$ to $X_n$ according to said extraction plan algorithm; and b) a segment for controlling merging of the extracted items into a single output stream from the respective subsets of items in said final sequenced set.

9. The computer program of claim 8 wherein the items input to the system are pre-sequenced in a prioritized order and the program has a segment for inputting the prioritized order and an identity of each order into a computer as parameters in the sorting segment.

10. The computer program of claim 8 comprising segments for solving said insertion and extraction algorithms by, detecting position sequence order information of each item input to the staging station to develop an inventory of items being input, and computing on the insertion and extraction algorithms as a function of feed time and storage unit position of items actually stored in the storage units, and to be extracted therefrom.

11. The computer program of claim 8 wherein said items are mail items, the prioritized order is a walk order sequence of mail for a given mail carrier route, and the final sequenced set is a predetermined delivery order sequence for the given carrier route.

12. The computer program of claim 11 wherein said algorithms determine what time to extract a mail item based on its storage location wherein, if the current mail items being extracted is in a downstream position from the storage unit of the previously extracted mail item, then the current storage unit from which the mail item is to be extracted has to postpone extraction until the previous mail piece has passed by, and then if the current storage unit from which a mail piece is to be extracted is upstream from the previously extracted storage unit, then the current storage unit may extract a mail item before the previous mail item is extracted.

13. The computer program of claim 12 wherein the algorithms calculate the extraction time from the respective storage units of each mail item therein according to the following collation rules which determine the next sequence number of an item to be extracted as follows:

a) if the next sequence is in the same storage unit, then the extraction time of that item is the current time+1;

b) if the next sequence number is upstream of the current storage unit from which an item is being extracted, then the extraction time is the current time (minus)−(difference in current and next storage unit−1); and c) if the next sequence number is downstream of the current storage unit from which an item is being extracted, then the extraction time is the current time (plus)+(difference in current and next storage units+1).

14. The computer program of claim 13 including the further steps of measuring the distance between mail items being transported, and generating a signal indicating a jam condition of the mail items if the distance between any two or more mail items is outside of a predetermined range of distances.

* * * * *